(12) United States Patent
Yoshimoto

(10) Patent No.: US 12,273,427 B2
(45) Date of Patent: Apr. 8, 2025

(54) NOTIFICATION SENDING APPARATUS, NOTIFICATION RECEIVING APPARATUS, NOTIFICATION DELIVERY SYSTEM INCLUDING THESE, AND NOTIFICATION SENDING METHOD

(71) Applicant: Canon Kabushiki Kaisha, Tokyo (JP)

(72) Inventor: Yuhei Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/339,351

(22) Filed: Jun. 22, 2023

(65) Prior Publication Data

US 2023/0421656 A1 Dec. 28, 2023

(30) Foreign Application Priority Data

Jun. 27, 2022 (JP) .................................. 2022-102801

(51) Int. Cl.
*H04L 67/55* (2022.01)
(52) U.S. Cl.
CPC .................................... *H04L 67/55* (2022.05)
(58) Field of Classification Search
CPC ...................................................... H04L 67/55
See application file for complete search history.

(56) References Cited

U.S. PATENT DOCUMENTS

2019/0116140 A1* 4/2019 Bailly .................... H04L 51/043
2019/0277939 A1* 9/2019 Li ........................... G01S 13/878

FOREIGN PATENT DOCUMENTS

JP        2006-311013 A       11/2006

* cited by examiner

*Primary Examiner* — Emmanuel L Moise
*Assistant Examiner* — Xiang Yu
(74) *Attorney, Agent, or Firm* — Venable LLP

(57) ABSTRACT

A notification sending apparatus comprising: a self notification identifier attaching unit configured to attach a self notification identifier to each notification, the self notification identifier having at least a sending ordinal position identification function; a sent notification identifier attaching unit configured to attach, to each notification, the self notification identifier attached to a notification that was sent immediately before each notification, as a sent notification identifier; a sending unit configured to send a notification receiving apparatus the notifications, each of which is attached with the self notification identifier and the sent notification identifier; and a re-sending unit configured, upon receipt of a re-send request including a range specifying information from the notification receiving apparatus, to obtain at least one notification that has been sent and needs to be re-sent based on the range specifying information, and to re-send the at least one obtained notification to the notification receiving apparatus.

13 Claims, 26 Drawing Sheets

DESTINATION-SPECIFIC NOTIFICATION LIST 400

| DESTINATION IDENTIFIER | 001 | 002 | 003 | 004 | ... |
|---|---|---|---|---|---|
| SENT NOTIFICATION IDENTIFIER LIST | a | a | b | g | |
| | b | c | c | h | |
| | e | e | d | i | |
| | f | g | e | j | |
| | j | h | g | – | |
| | – | j | h | – | |
| | – | – | i | – | |

NOTIFICATION CONTENT LIST 500

| SELF NOTIFICATION IDENTIFIER 501 | NOTIFICATION CONTENT 502 |
|---|---|
| a | A |
| b | B |
| c | C |
| d | D |
| e | E |
| f | F |
| g | G |
| h | H |
| i | I |
| j | J |

FIG.5

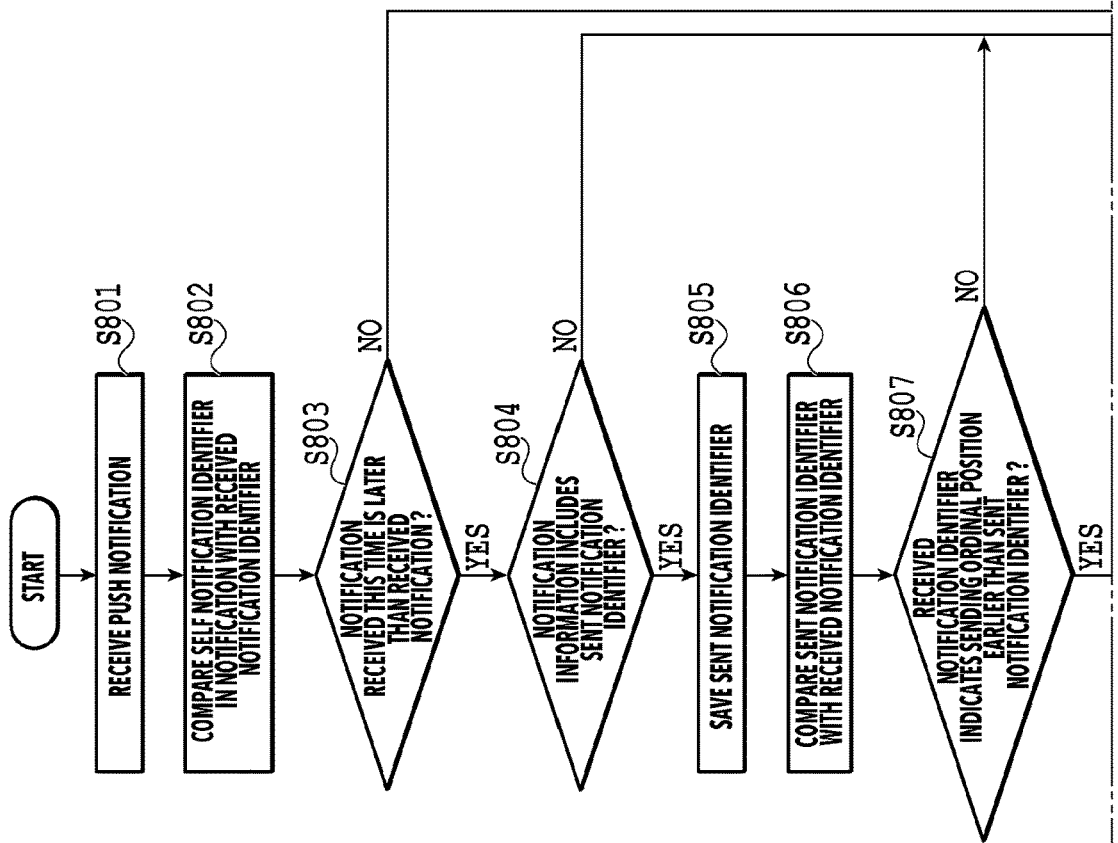

NOTIFICATION CONTENT LIST 1700

| SELF NOTIFICATION IDENTIFIER 1701 | SELF ORDINAL POSITION IDENTIFIER 1703 | NOTIFICATION CONTENT 1702 |
|---|---|---|
| a | aa | A |
| b | bb | B |
| c | cc | C |
| d | dd | D |
| e | ee | E |
| f | ff | F |
| g | gg | G |
| h | hh | H |
| i | ii | I |
| j | jj | J |

FIG.17

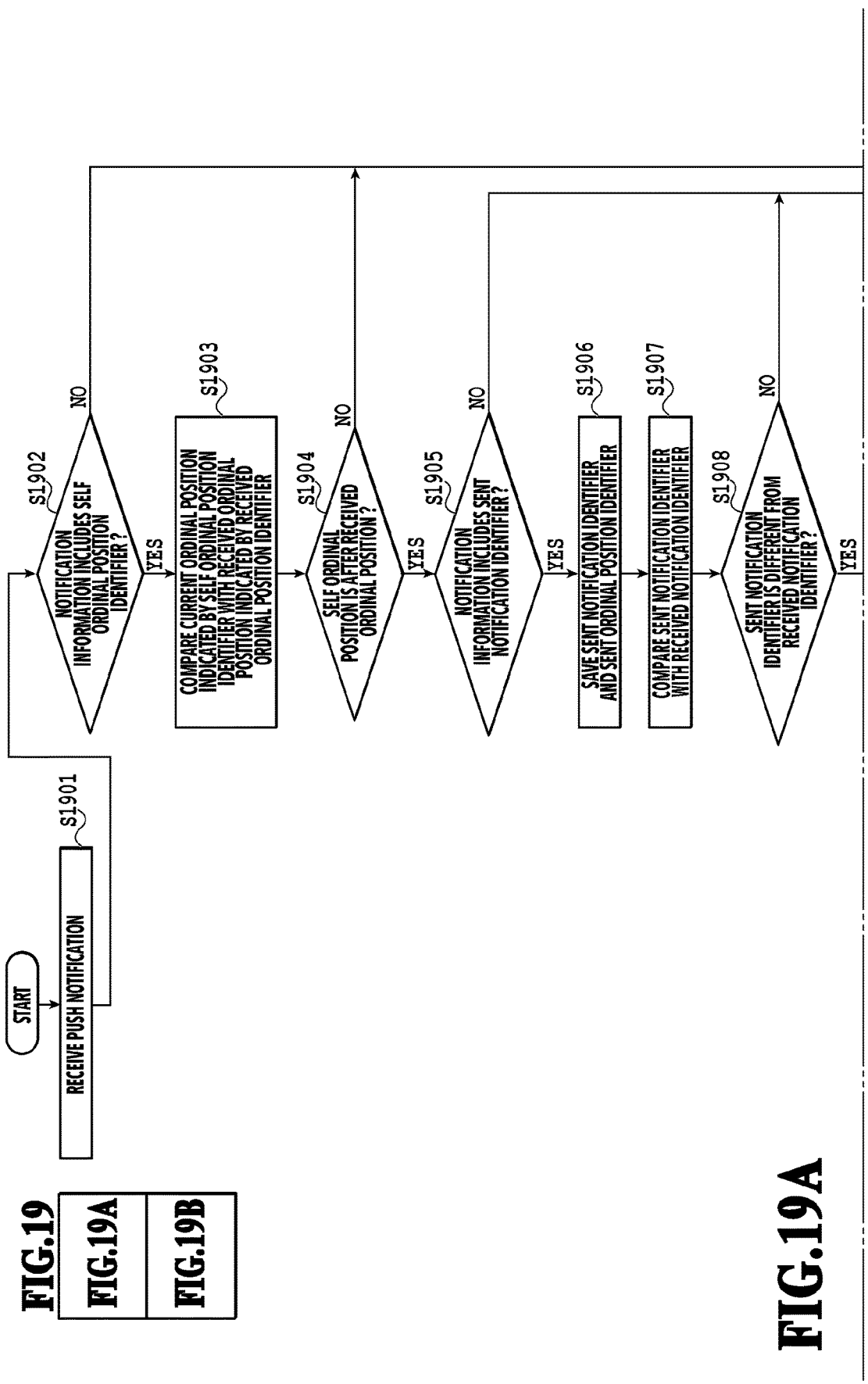

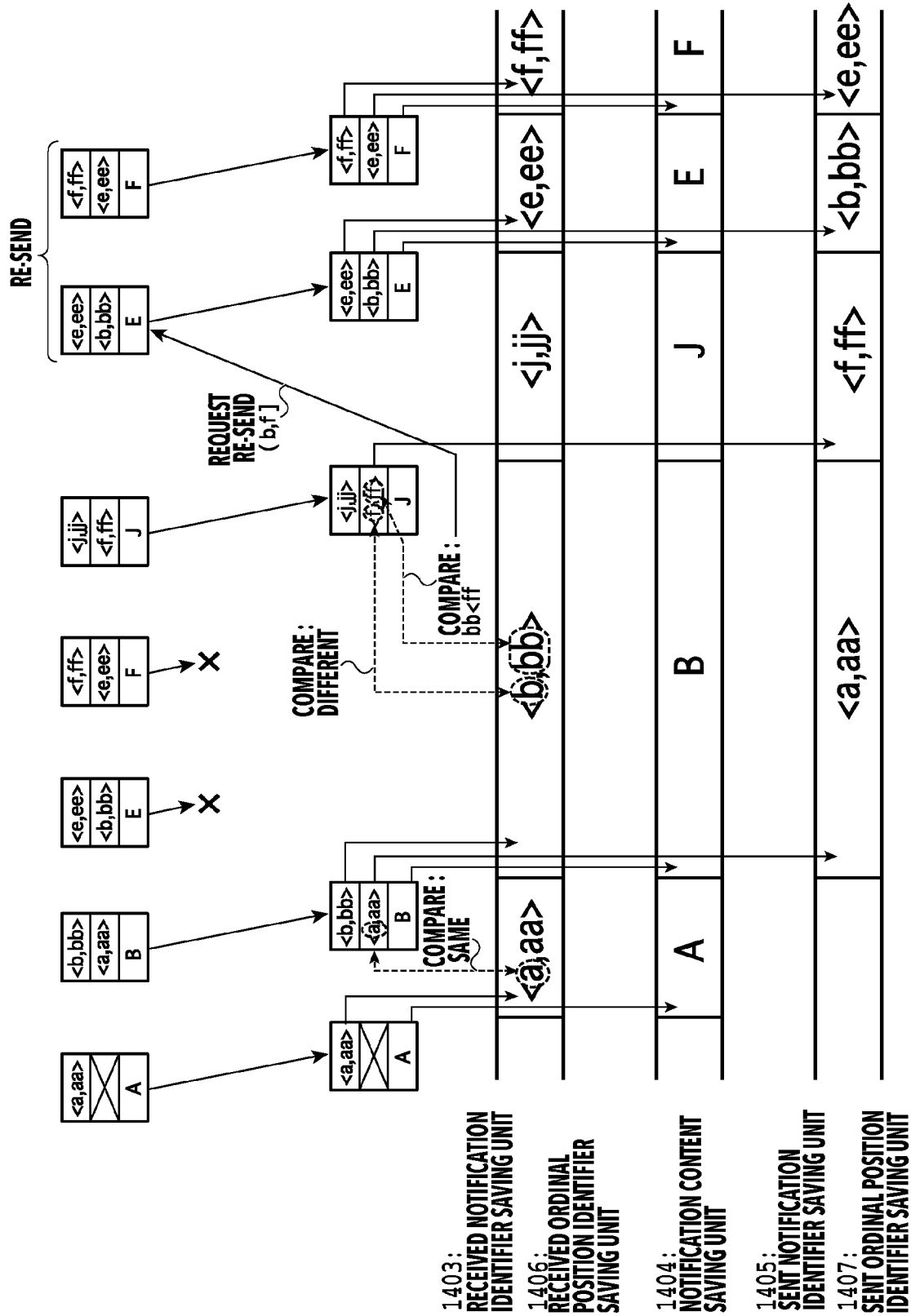

| FIG.22A |
| FIG.22B |

NOTIFICATION SENDING APPARATUS, NOTIFICATION RECEIVING APPARATUS, NOTIFICATION DELIVERY SYSTEM INCLUDING THESE, AND NOTIFICATION SENDING METHOD

BACKGROUND OF THE INVENTION

Field of the Invention

The present disclosure relates to a notification sending apparatus, a notification receiving apparatus, a notification delivery system including these, and a notification sending method.

Description of the Related Art

A push notification service sends a push notification from a notification management server to an application operating on a terminal apparatus such as a smartphone or a personal computer via a push notification server. The push notification service can provide the terminal apparatus with a service and campaign information related to the application. The push notification service can also provide the terminal apparatus with data for updating the application. Upon receipt of a push notification, the terminal apparatus can display at least part of the notification content included in the push notification received. Then, the entire notification content included in the push notification received can also be displayed in a case where a user selects what is being displayed. Alternatively, upon receipt of a push notification, the terminal apparatus can choose not to display a content related to the notification received and cause the application to perform processing internally based on the notification content included in the push notification. A push notification is sent from a server end to an application even without a request from the application. As long as the application is operating, the application does not miss a notification content in a push notification.

Japanese Patent Laid-Open No. 2006-311013 (hereinafter referred to as Literature 1) discloses a system, which has terminals connected to one another via a group of communication relay apparatuses, sends a notification content from one terminal to a communication relay apparatus by push notification and sends the notification content from the communication relay apparatus to a plurality of other terminals by fetch communication.

In a period in which an application is not operating, the application cannot receive a notification content sent from the server end by push notification. It is conceivable to employ a configuration in which a cache is provided in the terminal apparatus so that in a case where a notification content is sent from the server end by push notification in a period in which the application is not operating, the notification content may be temporarily held in the cache. However, the number of notifications that can be cached is limited.

In a case where push notifications sent from the server end to a terminal apparatus in a period in which the application is not operating exceed a cacheable amount, the application activated after that can receive only a cacheable number of push notifications out of the push notifications sent thereto. Thus, the application cannot receive some of the push notifications.

The application can avoid missing push notifications by using handshake communications between the application and the notification management server to check whether a notification content sent by push notification has been received by the user terminal. However, each handshake requires a communication from the application to the notification management server and a communication from the notification management server to the application. Executing handshake communications on every push notification would put a heavy load on both of the terminal apparatus and the notification management server.

Also, the application can avoid missing notifications by using not push notification but fetch notification, in which the application end spontaneously obtains information. However, this puts a heavy load on the terminal apparatus because the application needs to send a send request periodically to the server end even in a case where there is no notification content to obtain.

In the technique disclosed in Literature 1, the terminal uses fetch notification to obtain a notification content sent by push notification to a communication relay apparatus, as needed. Thus, even in a case where the terminal is offline at the time when the push notification is sent, the notification content arrives at the communication relay apparatus. However, in a case where the terminal is offline at the time when the push notification is sent, an identifier that the terminal needs to save therein in advance in order to identify the notification content for fetch notification does not arrive at the terminal. Also, in a case where a plurality of push notifications are sent from the sender terminal in a period in which the communication relay apparatus is offline, those push notifications may not arrive at the other terminals.

SUMMARY OF THE INVENTION

An embodiment of the present disclosure provides a notification sending apparatus in a notification delivery system including the notification sending apparatus for sending notifications and a notification receiving apparatus for receiving the notifications, the notification sending apparatus comprising: a self notification identifier attaching unit configured to attach a self notification identifier to each notification, the self notification identifier having at least a sending ordinal position identification function; a sent notification identifier attaching unit configured to attach, to each notification, the self notification identifier attached to a notification that was sent immediately before each notification, as a sent notification identifier; a sending unit configured to send the notification receiving apparatus the notifications, each of which is attached with the self notification identifier and the sent notification identifier; and a re-sending unit configured, upon receipt of a re-send request including a range specifying information from the notification receiving apparatus, to obtain at least one notification that has been sent and needs to be re-sent based on the range specifying information, and to re-send the at least one obtained notification to the notification receiving apparatus.

Further features of the present invention will become apparent from the following description of exemplary embodiments with reference to the attached drawings.

BRIEF DESCRIPTION OF THE DRAWINGS

FIG. 4 is a diagram showing an example of a destination-specific notification list in the first embodiment;

FIG. 5 is a diagram showing an example of a notification content list in the first embodiment;

FIG. 8 is a diagram showing the relationship of FIGS. 8A and 8B;

FIGS. 8A and 8B constitute a flowchart showing processing performed by an application in the first embodiment;

FIG. 17 is a diagram showing an example of a notification content list in the second embodiment;

FIG. 19 is a diagram showing the relationship of FIGS. 19A and 19B;

FIGS. 19A and 19B constitute a flowchart showing processing performed by an application in the second embodiment;

FIG. 20 is a timing diagram showing Operation Example 5 of the notification delivery system of the second embodiment;

DESCRIPTION OF THE EMBODIMENTS

Figure 1:
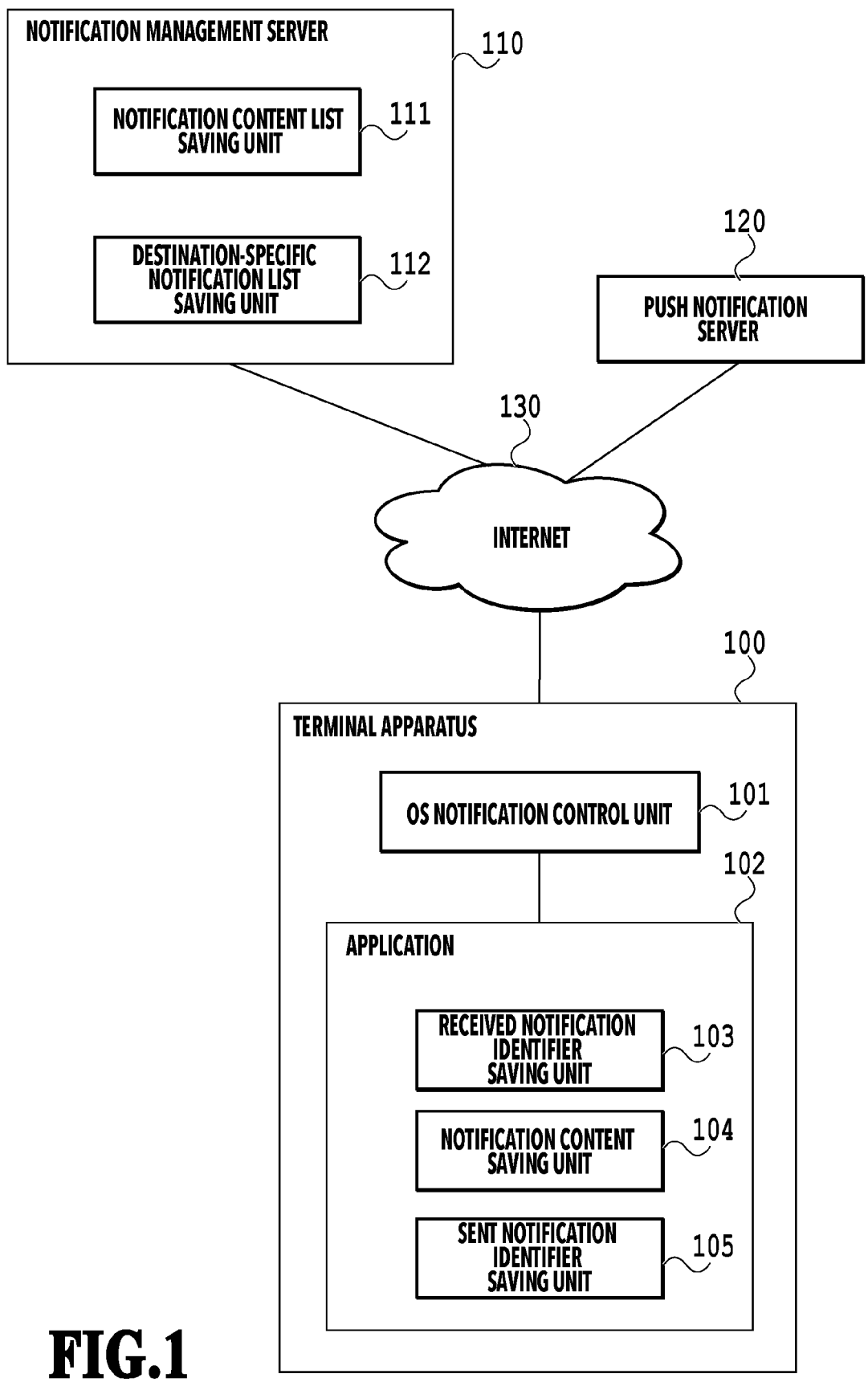
FIG. 1 is a diagram of the configuration of a notification delivery system of a first embodiment.

The following describes embodiments in detail with reference to the drawings attached hereto. Note that the following embodiments are not to limit the invention according to the scope of claims. While a plurality of features are described in each embodiment, not all the features are necessarily essential to the invention, and also, a plurality of features may be combined in any way. Further, throughout the drawings attached hereto, the same or similar configurations are denoted by the same reference numerals to omit repetitive descriptions.

First Embodiment

FIG. 1 is a diagram showing an example overall configuration of a notification delivery system of the present embodiment. The present notification delivery system includes a terminal apparatus 100, a notification management server 110, and a push notification server 120.

The notification management server 110 is a server including a notification content list holding unit 111 and a destination-specific notification list holding unit 112. Also, the notification management server 110 creates push notification information 200 (see FIG. 2) to be sent to the terminal apparatus 100, and sends a push notification including the notification information 200 toward the destination terminal apparatus 100. Note that the "push notification information" is hereinafter referred to simply as "notification information."

Figure 2:
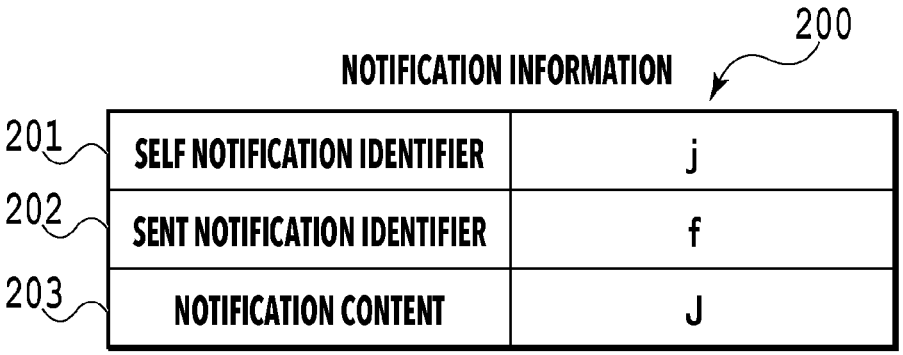
FIG. 2 is a diagram showing the configuration of notification information in the first embodiment.

With reference to FIG. 2, the notification information 200 includes a self notification identifier 201, a sent notification identifier 202, and a notification content 203, which will be described later.

The push notification server 120 is a server that sends the notification information 200 sent from the notification management server 110 to the terminal apparatus 100 by push notification.

The terminal apparatus 100 is an information processing apparatus including an operation system (hereinafter referred to as "OS") notification control unit 101 and an application 102. In the terminal apparatus 100, the OS notification control unit 101 can display the notification content included in a push notification received from the push notification server 120, and activate the application 102 in response to an operation. The application 102 has a received notification identifier holding unit 103, a notification content holding unit 104, and a sent notification identifier holding unit 105. The received notification identifier holding unit 103 is where the self notification identifier 201 included in a push notification received is stored as a received notification identifier. The notification content holding unit 104 is where the notification content 203 included in a push notification received is stored. The sent notification identifier holding unit 105 is where the sent notification identifier 202 included in a push notification received is stored.

The notification management server 110, the push notification server 120, and the terminal apparatus 100 are connected to one another via the Internet 130 and can communicate with one another.

Figure 3:
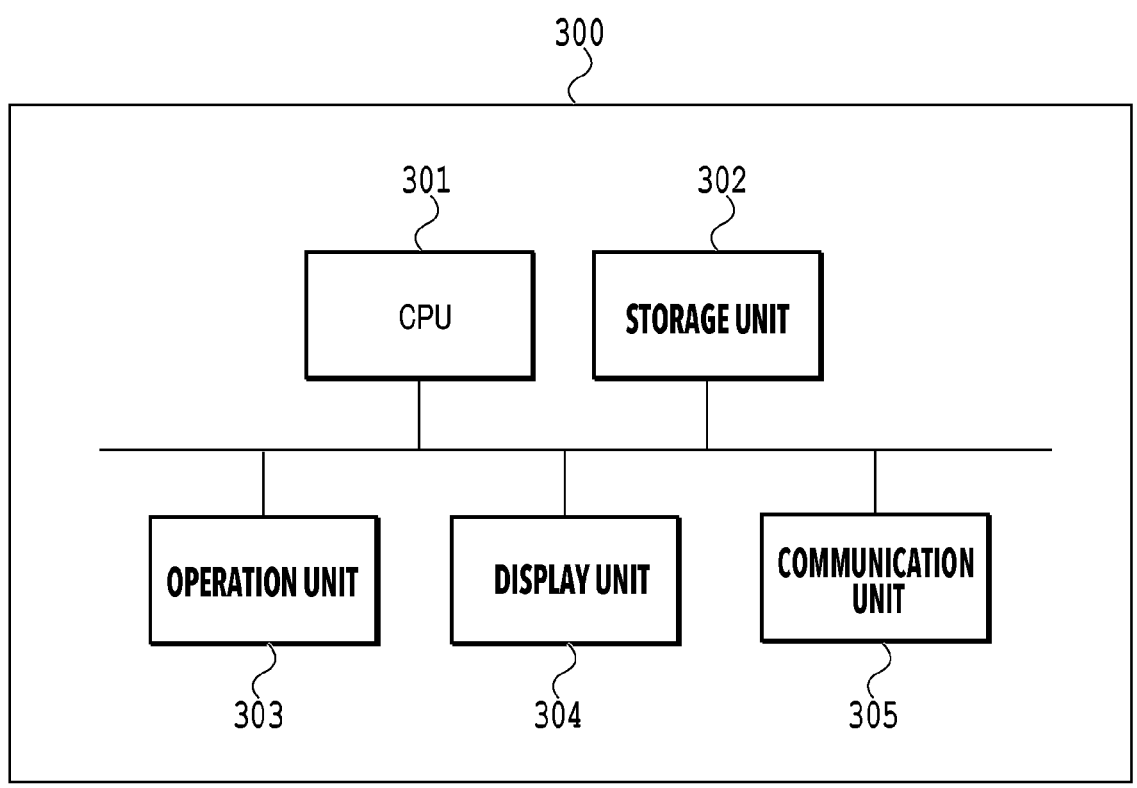
FIG. 3 is a functional block diagram of a terminal apparatus and a notification management server that are included in the notification delivery system of the first embodiment.

FIG. 3 shows an example hardware configuration of the terminal apparatus 100 and the notification management server 110. The terminal apparatus 100 and the notification management server 110 are each configured as a computer 300 including a CPU 301, a storage unit 302, an operation unit 303, a display unit 304, and a communication unit 305. The storage unit 302 includes, for example, a hard disk drive (HDD), a solid-state drive (SSD), and a random-access memory (RAM), and stores the OS, application programs, and data. The CPU 301 can implement each functional unit in the terminal apparatus 100 and the notification management server 110 by executing the OS and programs held in the storage unit 302. Note that the CPU 301 may use part of the storage unit 302 as a working area in executing programs. The operation unit 303 includes, for example, a keyboard and a pointing apparatus (such as a computer mouse). The operation unit 303 may also include a touch panel disposed at the display unit 304. The display unit 304 includes, for example, a liquid crystal display. The communication unit 305 includes, for example, a LAN card or a wireless LAN card. In the notification management server 110 in particular, the notification content list holding unit 111 and the destination-specific notification list holding unit 112 are provided in the storage unit 302. Also, in the terminal apparatus 100, the OS and the application 102 are held in the storage unit 302 and are implemented by being read from the storage unit 302 and executed by the CPU 301. The received notification identifier holding unit 103, the notification content holding unit 104, and the sent notification identifier holding unit 105 are provided in a storage region in the storage unit 302 set in the application 102.

The notification information 200 shown in FIG. 2 is described now. As already described, the notification information 200 includes the self notification identifier 201, the sent notification identifier 202, and the notification content 203. The notification content 203 is a content of which the application 102 is to be notified by the notification management server 110. The self notification identifier 201 has a self-other identification function and a sending ordinal position identification function, and is attached uniquely to each push notification including the notification content 203. The sent notification identifier 202 is the self notification identifier attached to the push notification that was sent immediately before the current push notification.

Referring to FIG. 4, a destination-specific notification list 400 held in the destination-specific notification list holding unit 112 has a plurality of columns for the respective destinations. The columns have sent notification identifier lists 402-1, 402-2, . . . 402-n corresponding to the respective destinations. Each sent notification identifier list 402-i includes a plurality of entries each attached with a sent notification identifier.

For instance, sent notification identifiers with the values of "a," "b," "e," "f," and "j" are attached to the entries for the sent notification identifier list 402-1 corresponding to the destination having an identifier "001." This indicates that notifications with the self notification identifiers "a," "b," "e," "f," and "j" have been sent to the destination assigned with the identifier "001".

Referring to FIG. 5, a notification content list 500 held in the notification content list holding unit 111 has a plurality of entries each having a pair of a self notification identifier and a notification content.

In the example in FIG. 5, the pairs of the self notification identifier and the notification content are, from top down, (a, A), (b, B), (c, C), and so on. These pairs indicate that a notification content "A" was first generated and attached with a self notification identifier "a," a notification content "B" was next generated and attached with a self notification identifier "b," a notification content "C" was then generated and attached with a self notification identifier "c," and a similar process was repeated. Note that attaching an identifier to a notification content is equivalent to attaching the identifier to a notification containing the notification content.

FIGS. 4 and 5 indicate that a notification content "A" attached with the self notification identifier "a" and a notification content "B" attached with the self notification identifier "b" were sent to the destination assigned with the destination identifier "001" and then after that, a notification content "E" attached with the self notification identifier "e," a notification content "F" attached with the self notification identifier "f," and the like were sent to the destination assigned with the destination identifier "001." A notification content "C" attached with a self notification identifier "c," a notification content D attached with a self notification identifier "d," and the like were not set to the destination assigned with the destination identifier "001."

Figure 6:
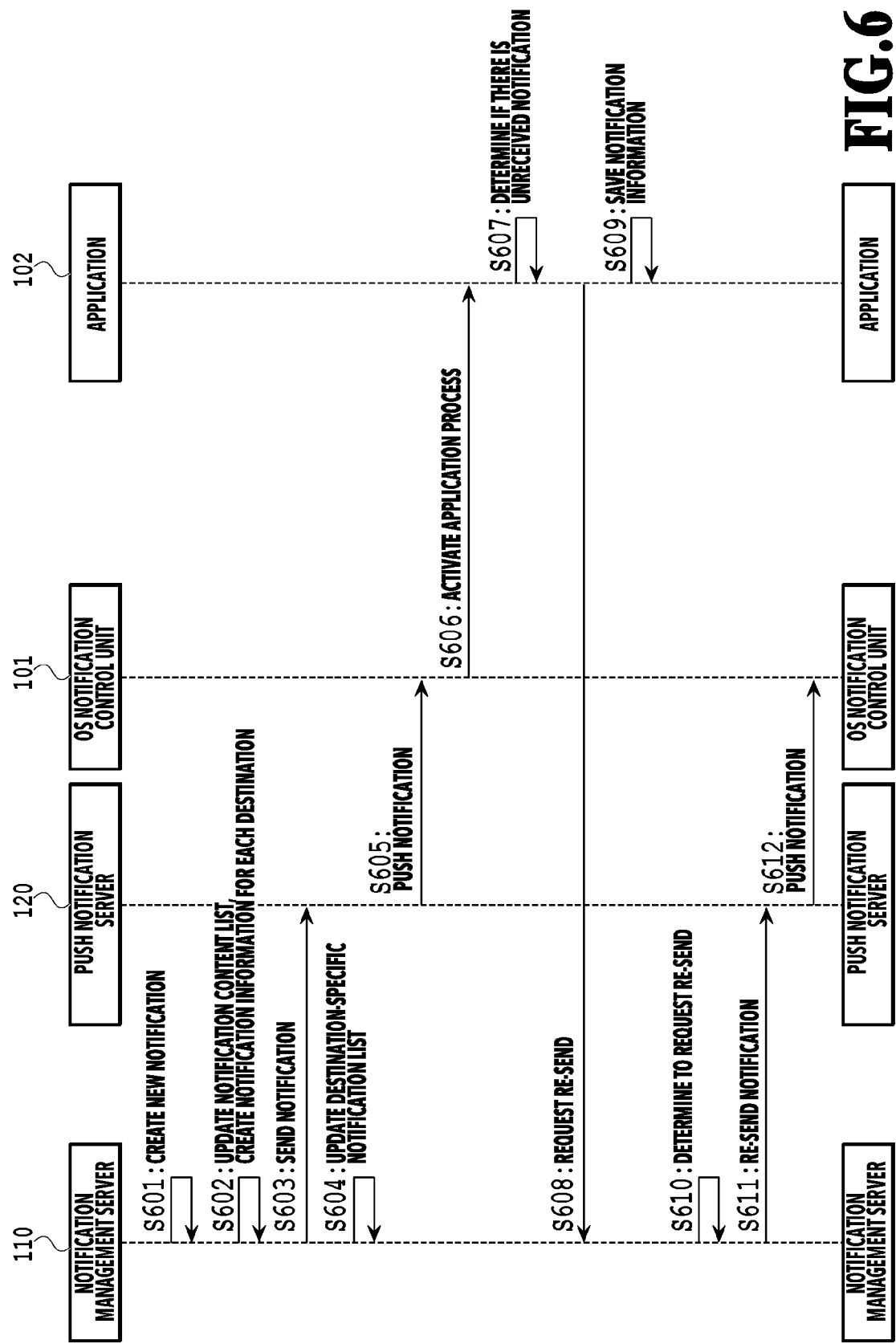
FIG. 6 is a sequence diagram showing the operation of the notification delivery system of the first embodiment.

FIG. 6 is a sequence diagram showing the basic operations performed by the notification management server 110, the push notification server 120, the OS notification control unit 101, and the application 102. Also, FIG. 6 particularly shows an operation performed in an event where the terminal apparatus 100 that basically receives push notifications requests the notification management server 110 to re-send an unreceived push notification. In the drawings and the descriptions below, "Step S" is denoted simply as "S."

First, in S601, the notification management server 110 creates a new notification content 203. This causes processing to start.

Next, in S602, the notification management server 110 generates a self notification identifier 201 to be attached to a push notification including the notification content 203 created in S601. Then, the notification management server 110 adds an entry to the notification content list 500, the entry having a pair of this self notification identifier 201 and the notification content 203 created in S601.

Also, in S602, after the notification management server 110 or a different apparatus determines one or more destinations for the new push notification including the new notification content 203, the notification management server 110 updates the notification information 200 (see FIG. 2) for each destination. Each of the destinations is identified by, for example, a combination of a terminal apparatus, a user, and an application.

Next, in S603, the notification management server 110 sends the push notification server 120 a notification including the notification information 200 updated in S602.

Next, in S604, from the destination-specific notification list 400 (see FIG. 4), the notification management server 110 selects a sent notification identifier list 402-i (i=1, 2, . . . n) corresponding to the destination to which the notification was sent in S603. Then, to the sent notification identifier list 402-i thus selected, the notification management server 110 adds the self notification identifier 201 included in the push notification sent this time, as a sent notification identifier. The sent notification identifier added to the sent notification identifier list 402-i is used as the sent notification identifier 202 to be included in a push notification which will be sent to the same destination next time. As will be described later, the sent notification identifier added to the sent notification identifier list 402-i is also used to obtain a notification content that needs to be re-sent by push notification in response to a push notification re-send request from the application 102. The following denotes the "push notification re-send request" simply as a "re-send request."

Next, in S605, the push notification server 120 receives the push notification sent from the notification management server 110 and sends a push notification corresponding to the received notification to the destination.

The push notification sent from the push notification server 120 is received by the OS notification control unit 101 of the terminal apparatus 100 being the destination.

In S606, receiving the push notification, the OS notification control unit 101 informs the application 102 of the reception of the push notification and activates a process executable upon notification reception, which is registered in the application 102.

In S607, the application 102 is a process that can be executed upon receipt of a push notification. Also, based on the sent notification identifier included in the push notification and the received notification identifier held in the received notification identifier holding unit 103, the application 102 confirms whether there is any unreceived push notification. The received notification identifier held in the received notification identifier holding unit 103 is the self notification identifier included in the push notification received most recently.

Although details will be described later, it is determined that there is no unreceived push notification in a case where the sent notification identifier and the received notification identifier are the same. In contrast, it is determined that there is an unreceived push notification in a case where the received notification identifier indicates a sending ordinal position which is temporally before the sent notification identifier attached to the push notification received this time.

If it is determined that there is an unreceived push notification, in S608 the application 102 sends a re-send request to the notification management server 110. A pair of the latest received notification identifier in the application 102 and the sent notification identifier included in the push notification is received by the application this time are attached to the re-send request as range specifying information. The latest received notification identifier in the application 102 is held in the received notification identifier holding unit 103. Alternatively, a pair of the latest received notification identifier in the application 102 and the self notification identifier included in the push notification that is received by the application this time may be attached to the re-send request as range specifying information.

In S609 which is activated simultaneously with S608 from S607, the application 102, in parallel with the re-send request making, stores the notification information 200 included in the received push notification to the holding unit included in the application 102. Specifically, the application 102 stores, to the received notification identifier holding unit 103, the self notification identifier included in the received push notification, as the received notification identifier. Also, the application 102 stores the notification content included in the received push notification to the notification content holding unit 104.

The application 102 also stores the sent notification identifier included in the received push notification to the sent notification identifier holding unit 105, the timing of this will be described later. The self notification identifier, the notification content, and the sent notification identifier obtained from the notification information 200 included in a single push notification are linked together and stored to their corresponding holding units. To be more specific, the self notification identifier is stored to the received notification identifier holding unit 103, the notification content is stored to the notification content holding unit 104 while being linked to the self notification identifier, and the sent notification identifier is stored to the sent notification identifier holding unit 105 while being linked to the self notification identifier.

In S610, based on the range specifying information attached to the re-send request, the destination-specific notification list 400, and the notification content list 500, the notification management server 110 that has received the re-send request confirms, for each notification content, whether it is necessary to re-send the push notification. This is the same as what will be described later with reference to FIG. 9 and is therefore not described here.

If it is determined that it is necessary to re-send at least one push notification including a notification content, in S611, the notification management server 110 re-sends the push notification including the notification content, toward the terminal that has requested the re-sending.

In S612, based on the push notification re-sent from the notification management server 110, the push notification server 120 sends a push notification to the OS notification control unit 101 of the terminal apparatus 100 having the application that has requested re-sending of the push notification.

Note that it is sufficient for the self notification identifier 201 to be able to uniquely identify a notification content 203 in a predetermined range. Also, it is sufficient for the self notification identifier to be able to indicate the ordinal position of the notification content 203 that the notification management server 110 sends toward the application 102, in a predetermined range. This is true for the sent notification identifier 202.

Figure 7:
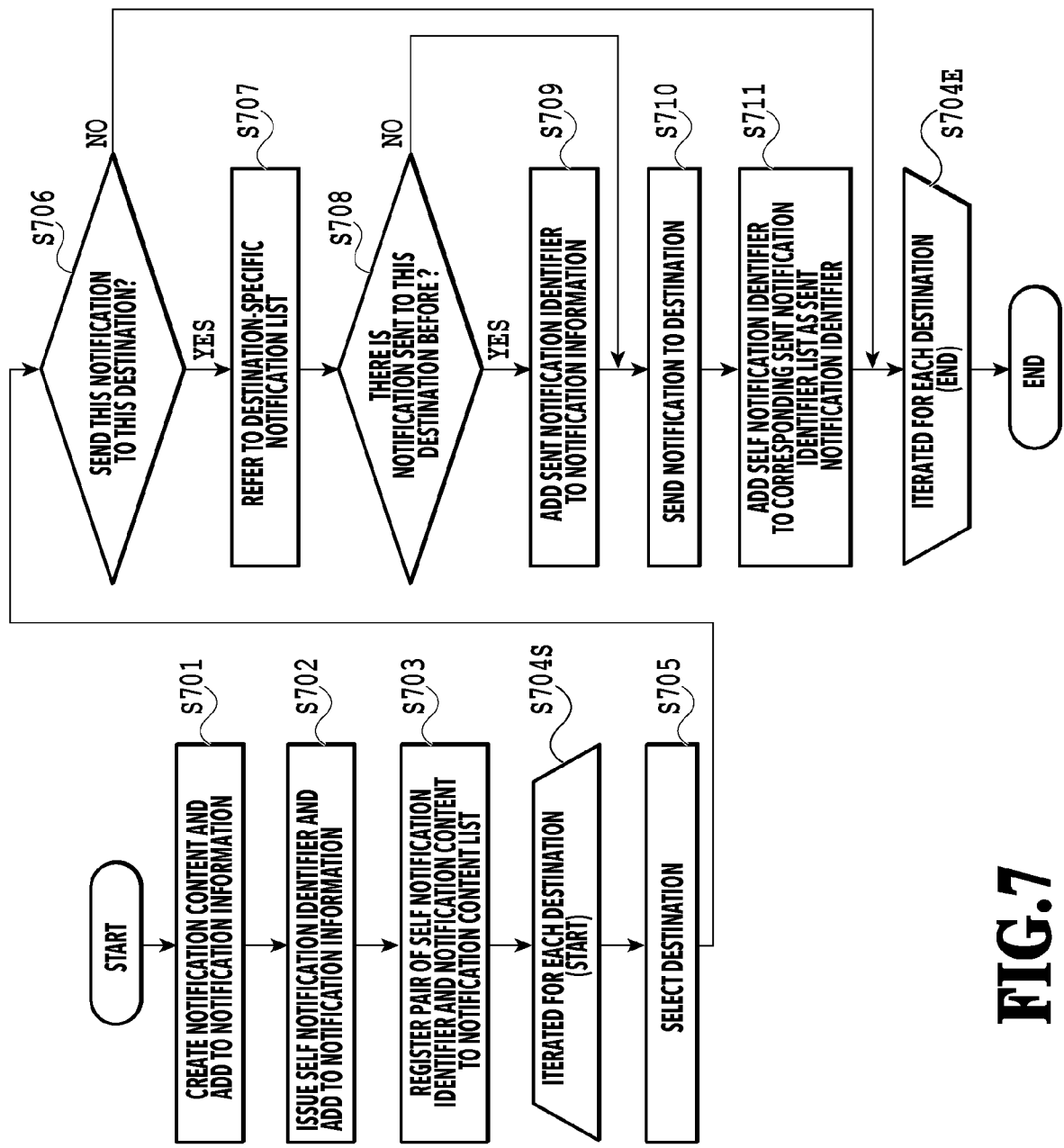
FIG. 7 is a flowchart showing sending processing performed by the notification management server in the first embodiment.

FIG. 7 is a flowchart showing processing performed by the notification management server 110. The processing starts with creating a new notification content and ends with sending the notification to the push notification server 120. First, in S701, the CPU 301 of the notification management server 110 creates a new notification content 203 and includes the notification content 203 in notification information 200. Examples of the new notification content include a content to be displayed on the screen of the terminal apparatus 100 and a content to be supplied to the application 102.

After creating the new notification content, in S702, the CPU 301 of the notification management server 110 issues a new notification identifier as a self notification identifier 201 and includes the self notification identifier 201 in the notification information 200.

The self notification identifier 201 enables unique identification of a notification content or a push notification including the notification content. Also, the self notification identifier 201 is in conformity with such a format that enables identification of the temporal issuance ordinal position of a notification content or the temporal sending ordinal position of a notification at least relatively based on the self notification identifier 201. The following description refers to "identifying a sending ordinal position at least relatively" simply as "identifying a sending ordinal position" and refers to an "at least relative sending ordinal position" simply as a "sending ordinal position." The same is true for the issuance ordinal position. Thus, in a case where there are a plurality of different push notifications, they can be rearranged in the order in which they were sent, based on their self notification identifiers 201.

The process using the self notification identifier, the sent notification identifier, and the received notification identifier, which will be described later with reference to FIGS. 8A and 8B and which is performed in an event where the application receives a notification, makes it possible to determine whether there is an unreceived notification using small amount of information.

In this way, a new self notification identifier 201 is issued for the notification content 203, and the self notification identifier 201 and the notification content 203 are included in the notification information 200.

Next in S703, the CPU 301 of the notification management server 110 registers a pair of a self notification identifier 501 and a notification content 502 in the notification content list 500 shown in FIG. 5 as a new entry. Here, the self notification identifier 501 and the notification content 502 are the same as the self notification identifier 201 and the notification content 203 included in the notification information 200.

Next, S704S to S704E are iterated for each destination.

In each iteration, first, in S705, the CPU 301 of the notification management server 110 selects a destination for the current iteration.

In the present embodiment, as a destination, the service provider can set a combination of an application, a terminal apparatus having the application, and a user logged in to use the application, and the notification management server 110 determines a destination based on this setting. The destination may be determined differently. For example, in a case where users of a terminal apparatus all use the same application, the destination may be determined based on a combination of only the application and the terminal apparatus having the application. Also, for example, in a case where there is only one terminal apparatus with which the user is signed up, and there is only one application installed in the terminal apparatus, the destination may be determined based only on the terminal apparatus.

Next, in S706, the CPU 301 of the notification management server 110 confirms whether the destination selected in S705 is the terminal apparatus to be notified of the notification content created in S701 of the current sequence. If so (YES), the CPU 301 of the notification management server 110 advances the processing to S707, and if not (NO), the current iteration is ended. In relation to this, referring to FIG. 4, the destinations with the identifiers "001" and "002" are the destinations of the notification content attached with "a" as a self notification identifier, whereas the destinations with the identifiers "003" and "004" are not the destinations of the notification content attached with "a" as a self notification identifier.

In S707, the CPU 301 of the notification management server 110 refers to the destination-specific notification list 400 shown in FIG. 4. By using the destination-specific notification list 400 held in the destination-specific notification list holding unit 112, the CPU 301 of the notification management server 110 manages the sent notification identifiers corresponding to notifications already sent to the destinations.

In S708, based on the sent notification identifiers recorded in the destination-specific notification list 400, the CPU 301 of the notification management server 110 confirms whether a push notification has been sent to the destination in the past. Specifically, the determination is made based on whether the sent notification identifier list 402-$i$ in the destination-specific notification list 400 corresponding to the destination has recorded therein a sent notification identifier indicating an ordinal position temporally before the self notification identifier issued in S702.

If there is a push notification that was sent to the destination in the past, the CPU 301 of the notification management server 110 determines "YES" in S708 and attaches the latest sent notification identifier to the notification information 200 in S709. As a result, as shown in FIG. 2, the notification information 200 includes the self notification identifier 201, the sent notification identifier 202, and the notification content 203.

If there is no push notification that was sent to the destination in the past, the CPU 301 of the notification management server 110 determines "NO" in S708 and bypasses S709. Thus, in a case where there is no push notification that has been sent in the past, the notification information 200 includes self notification identifier 201 and the notification content 203, but does not include the sent notification identifier 202.

Next, in S710, the CPU 301 of the notification management server 110 uses the communication unit 305 to send the push notification server 120 a notification that includes the new notification information 200 including the self notification identifier 201, the sent notification identifier 202, and the notification content 203. Upon receipt of the new notification information 200, the push notification server 120, based on this, sends a push notification including the new notification information 200 to the notification destination.

Finally, in S711, from a plurality of sent notification identifier lists 400-1 to 400-$n$ in the destination-specific notification list 400, the CPU 301 of the notification management server 110 searches for a sent notification identifier list 400-$i$ corresponding to the current destination. Then, the CPU 301 of the notification management server 110 adds the self notification identifier to the sent notification identifier list 400-$i$ thus searched for, as a sent notification identifier.

Figure 8B:
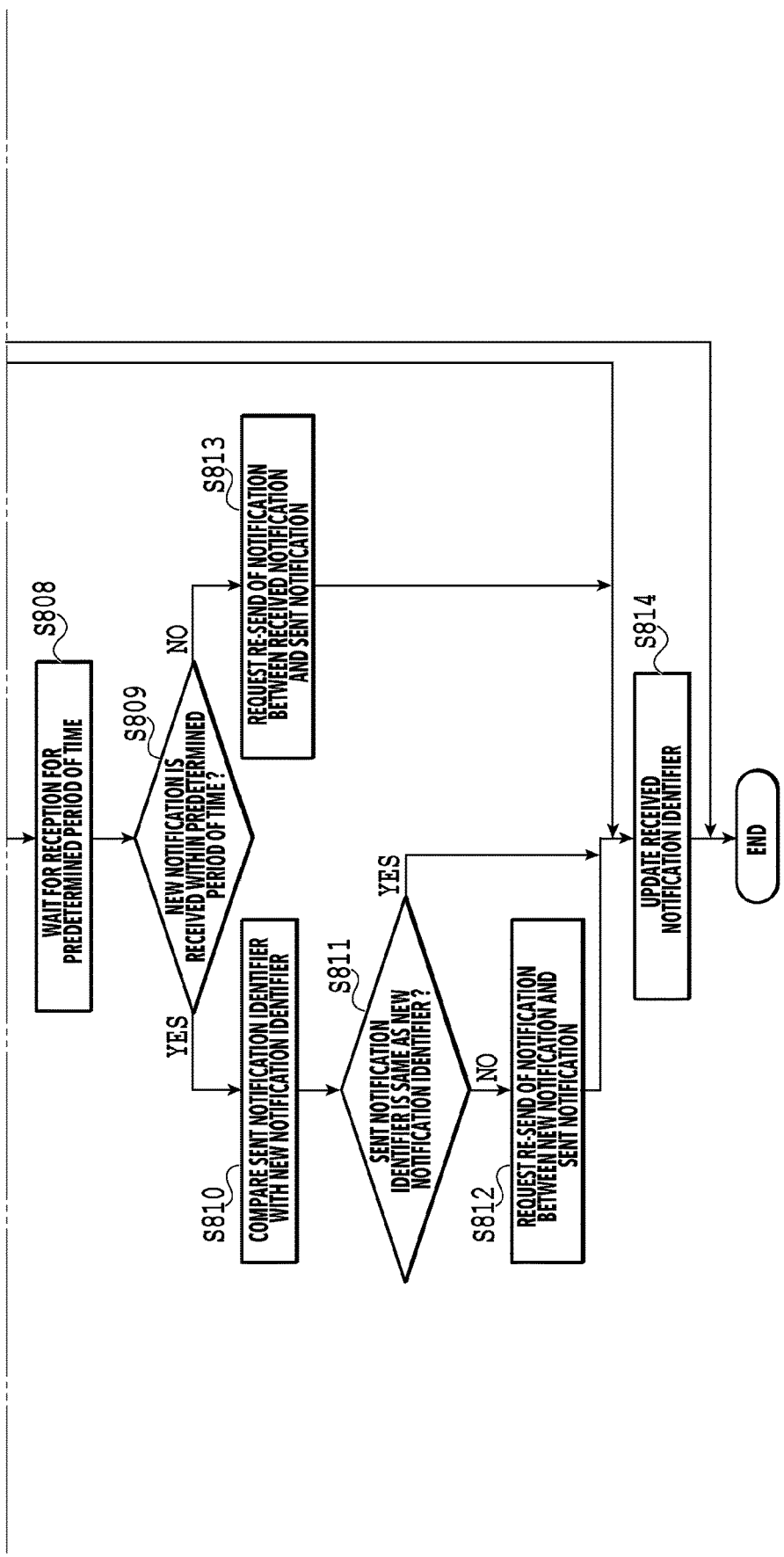

FIGS. 8A and 8B constitute a flowchart showing the processing performed by the application 102 upon receipt of a push notification, the application 102 being implemented by the CPU 301 of the terminal apparatus 100 executing programs. First, in S801, the application 102 is informed of receipt of a push notification by the OS notification control unit 101 and receives the push notification through a process executable upon receipt of a notification, which is registered in the application 102.

By using the OS notification control unit 101, the CPU 301 executing the application 102 can display the notification content 203 included in the push notification received, on the display unit (not shown) for the user. Also, the timing to display the notification content 203 on the screen for the user by using the OS notification control unit 101 may be any timing as long as it is within a period in which an in-application process which had already been activated at the time of the receipt of the push notification is being executed. Also, the notification content 203 may be displayed on the screen for the user by using the OS notification control unit 101 at any time while a process in an application is executed, where the application had been already activated when the push notification was received. Alternatively, the notification content 203 may be displayed on the screen for the user by using the OS notification control unit 101 at any time while a process in an application is executed, where the application was activated when the push notification was received. This is true for the notification content 203 included in a new push notification received in S807, S808 to be described later.

Next, in S802, the CPU 301 executing the application 102 compares the self notification identifier 201 included in the push notification received this time with the latest received notification identifier held in the received notification identifier holding unit 103.

In S803, if the self notification identifier 201 included in the push notification received this time indicates an ordinal position which is temporally after the latest received notification identifier held in the received notification identifier holding unit 103, it means that push notification received this time is the latest one. Thus, in this case, the CPU 301 executing the application 102 determines "YES" in S803 and advances the processing to S804. If not, it means that the processing related to the notification received this time has already been completed, and thus, the CPU 301 executing the application 102 determines "NO" in S803 and ends the processing.

Next, in S804, the CPU 301 executing the application 102 confirms whether the notification information 200 includes the sent notification identifier 202. In a case where the push notification received this time is the first notification, the notification information 200 does not include the sent notification identifier 202. In the other case, the notification information 200 includes the sent notification identifier 202. In S804, if the notification information 200 does not include the sent notification identifier 202, the CPU 301 executing the application 102 determines "NO" and advances the processing to S814.

In S804, if the notification information 200 includes the sent notification identifier 202, the CPU 301 executing the application 102 determines "YES" and advances the processing to S805. In S805, the CPU 301 executing the application 102 stores the sent notification identifier 202 in the notification information 200 to the sent notification identifier holding unit 105 as a new sent notification identifier, overwriting the old sent notification identifier.

Next, in S806, the CPU 301 executing the application 102 compares the sent notification identifier 202 included in the notification information 200 with the received notification identifier. The received notification identifier is held in the received notification identifier holding unit 103 as application data. In a case where the sent notification identifier 202 included in the notification information 200 is the same as the latest received notification identifier, it means that the application 102 received the notification that was sent from the notification management server 110 to the application 102 most recently. Thus, it is not necessary to request re-sending of the push notification. Hence, the CPU 301 executing the application 102 determines "NO" in S807 and ends the processing.

In a case where the latest received notification identifier indicates an ordinal position temporally before that of the sent notification identifier 202 included in the notification information 200 received this time, it means that there is a push notification that has been sent from the notification management server 110 but has not been received by the application 102. There are two possible reasons why there is a push notification which has been sent from the notification management server 110 but not received by the application 102.

The first reason is that the push notification was sent from the notification management server 110 in a period in which the application 102 was offline. The period in which the application 102 is offline is, for example, a period in which the terminal apparatus 100 is powered off, a period in which the terminal apparatus 100 is not connected to the Internet 130, or a period in which the application 102 is not activated. In an offline period, the application 102 does not receive a push notification sent from the notification management server 110.

The second reason is that the order of arrival of notifications at the application 102 is reversed due to differences between the notifications in their delay time at the push notification server 120 or on the Internet 130.

In the present embodiment, a push notification sent from the notification management server 110 but not received by the application 102 is re-sent from the notification management server 110 toward the application 102 upon the request by the application 102. This re-sending deals with both of the above two reasons.

In S807, if the latest received notification identifier does not indicate an ordinal position temporally before that of the sent notification identifier 202 included in the notification information 200 received this time, the CPU 301 executing the application 102 determines "NO" and advances the processing to S814.

In S807, if the latest received notification identifier indicates an ordinal position temporally before that of the sent notification identifier 202 included in the notification information 200 received this time, the CPU 301 executing the application 102 determines "YES" and advances the processing to S808.

In S808, to deal with the second reason, the CPU 301 executing the application 102 waits for reception of an unreceived notification for a predetermined period of time. In other words, the CPU 301 executing the application 102 suspends the process from advancing from S808 to S813 for the predetermined period of time. If the application 102 receives a new push notification within the predetermined period of time, the CPU 301 executing the application 102 determines "YES" in S809 and advances the processing to S810 and onward. Meanwhile, after the CPU 301 executing the application 102 waits for reception of an unreceived notification for the predetermined period of time in S808, if the CPU 301 confirms that the application 102 has not receive a new push notification within the predetermined period of time, the CPU 301 executing the application 102 determines "NO" (i.e., no longer suspension) in S809 and advances the processing to S813 and onward in order to deal with the first reason. This is because the predetermined period of time is set appropriately so that a new push notification may be received within the predetermined period of time if the second reason is the actual reason and is not received within the predetermined period of time if the first reason is the actual reason. To this end, the predetermined period of time is appropriately set within, for example, the range from several tens of seconds to several minutes.

If a new push notification is not received within the predetermined period of time, the CPU 301 executing the application 102 determines "NO" in S809, and requests the notification management server 110 to re-send one or more push notifications in S813. The one or more notifications are notifications sent from the notification management server 110 but not received by the application 102, or specifically, are notifications in a range from a notification just after the received notification to the latest sent notification. Thus, the CPU 301 executing the application 102 attaches a pair of the received notification identifier and the sent notification identifier to a re-send request as range specifying information. The received notification identifier here is the received notification identifier held in the received notification identifier holding unit 103, and the sent notification identifier here is the sent notification identifier 202 included in the push notification received in S801 in the current sequence. Note that the CPU 301 executing the application 102 may alternatively add a pair of the received notification identifier and the self notification identifier 201 to the re-send request as range specifying information.

Meanwhile, if receiving a new push notification within the predetermined period of time, the CPU 301 executing the application 102 determines "YES" in S809, and advances the processing to S810. In S810, the CPU 301 executing the application 102 compares the sent notification identifier with the new push notification identifier. The sent notification identifier here is the sent notification identifier held in the sent notification identifier holding unit 105. Also, the new push notification identifier is the self notification identifier included in the new push notification the reception of which is detected in S809.

Note that in a case of receiving a plurality of new push notifications within the predetermined period of time, the CPU 301 executing the application 102 selects the latest one of a plurality of push notification identifiers respectively corresponding to the plurality of new push notifications. Then, the CPU 301 executing the application 102 compares the selected new push notification identifier with the sent notification identifier held in the sent notification identifier holding unit 105.

Also, using the OS notification control unit 101, the CPU 301 executing the application 102 can display, on the display unit (not shown) for the user, the notification content included in the new push notification the reception of which was detected in S809.

In a case where a single new push notification is received within the predetermined period of time and its new push notification identifier is the same as the sent notification identifier, it means that the single new push notification is a push notification sent immediately before the push notification received in S801. The single new push notification has arrived at the application 102 with a delay. Thus, in such a case, the CPU 301 executing the application 102 determines "YES" in S811 and bypasses S812 of sending a re-send request.

In a case where a plurality of new push notifications are received within the predetermined period of time and where the latest one of their push notification identifiers is the same as the sent notification identifier, those new push notifications are a push notification sent immediately before the push notification received in S801 and one or more push notifications sent before that. Those new push notifications have arrived at the application 102 with a delay. Thus in such a case as well, the CPU 301 executing the application 102 determines "YES" in S811 and bypasses S812 of sending a re-send request.

Meanwhile, in a case where the single new push notification received within the predetermined period of time is not the same as the sent notification identifier, it means that there is still a push notification that has not arrived at the application 102 yet. In such a case, the CPU 301 executing the application 102 determines "NO" in S811 and advances the processing to S812. In S812, via the communication unit 305, the CPU 301 executing the application 102 sends the notification management server 110 a re-send request for push notifications in a range from a notification just after the single new push notification to the sent push notification. Also, if the push notification identifier of the latest one of the plurality of new push notifications received within the predetermined period of time is not the same as the sent notification identifier, the CPU 301 executing the application 102 determines "NO" in S811 and advances the processing to S812. Then, in S812, the CPU 301 executing the application 102 sends the notification management server 110 a re-send request for push notifications in a range from a notification after the latest one of the plurality of new push notifications to the sent notification.

A pair of the self notification identifier attached to the new notification content and the sent notification identifier are attached to the re-send request as range specifying information. The self notification identifier attached to the new notification content here is the self notification identifier 201 included in the new push notification (or the latest one of the plurality of new push notifications) the reception of which was detected in S808 and S809. Also, the sent notification identifier here is the sent notification identifier 202 included in the push notification received in S801 in the current sequence.

A pair of a self notification identifier corresponding to the new push notification and a self notification identifier may be attached to the re-send request as range specifying information. The self notification identifier corresponding to the new push notification here is the self notification identifier 201 included in the new push notification (or the latest one of the plurality of new push notifications) the reception of which was detected in S808 and S809. Also, the self notification identifier here is the self notification identifier 201 included in the push notification received in S801 in the current sequence.

The method for identifying a push notification to be re-sent based on the pair of the new push notification identifier and the sent notification identifier is the same as the method for identifying a notification to be re-sent based on the pair of the received notification identifier and the sent notification identifier. Also, the method for identifying a notification to be re-sent based on the pair of the new push notification identifier and the self notification identifier is the same as the method for identifying a notification to be re-sent based on the pair of the received notification identifier and the self notification identifier.

Except for a case where the determination in S803 is "NO," the CPU 301 executing the application 102 finally executes S814. In S814, the CPU 301 stores the self notification identifier 201 included in the push notification received in S801, that is at the start of the processing, to the received notification identifier holding unit 103 as a new received notification identifier, overwriting the old self notification identifier.

In the present embodiment, the notification identifiers (the self notification identifier 201 and the sent notification identifier 202) in the notification information 200 are expressed in such a format that the sending ordinal position of the notification content 203 is identifiable. Basically, preparation for the determination of the presence of an unreceived notification is made ready by simply storing self notification identifier 201 included in the notification information 200 in the push notification as a received notification identifier every time the destination application 102 receives a push notification. Then, the determination of the presence of an unreceived notification can be made by a comparison between the received notification identifier thus stored and the sent notification identifier included in the push notification received this time.

The application 102 executes the processing described with reference to FIGS. 8A and 8B upon receipt of a notification re-sent from the notification management server 110 as well. Thus, in a case where, for example, the application 102 cannot receive some of a plurality of push notifications re-sent thereto, the application 102 can request re-send of those push notifications again.

Figure 9:
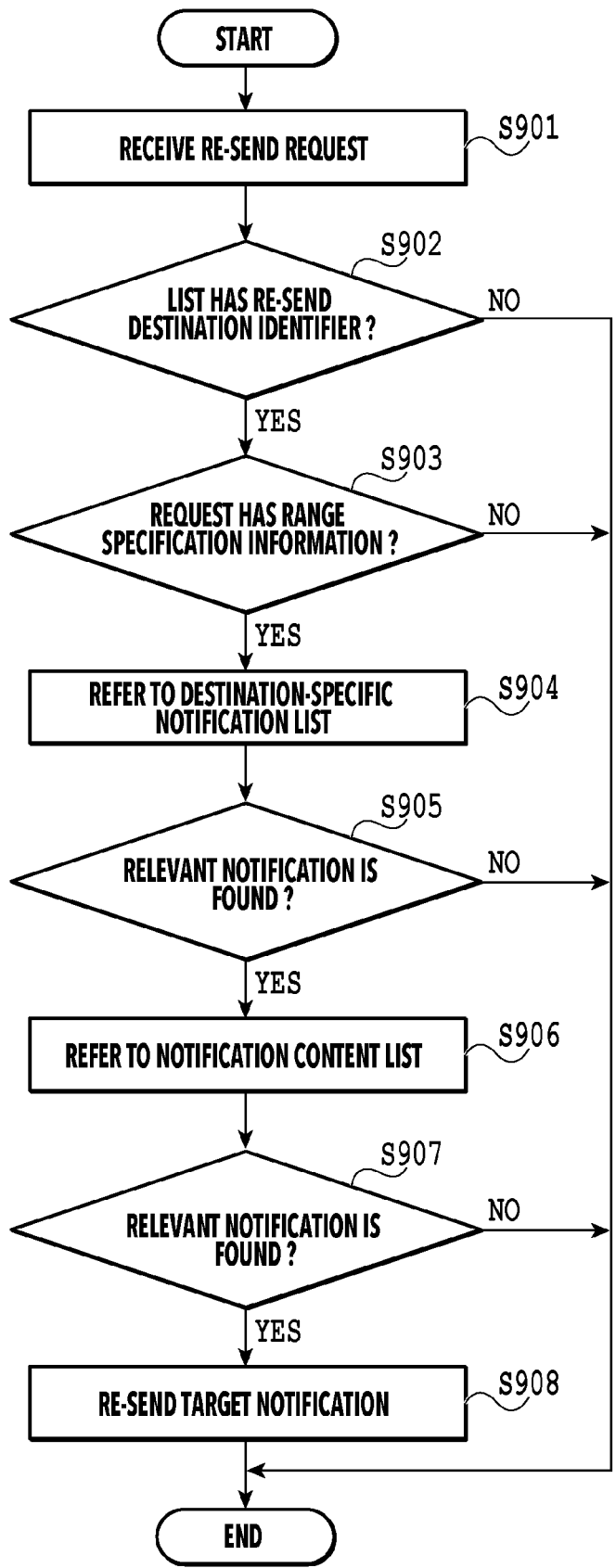
FIG. 9 is a flowchart showing re-sending processing performed by the notification management server in the first embodiment.

FIG. 9 is a flowchart of the processing that is performed by the notification management server 110. The processing includes receiving a re-send request and re-sending a notification.

In S901, the CPU 301 of the notification management server 110 starts processing upon receipt of a re-send request from the application 102 operating on the terminal apparatus 100 of a user.

In S902, the CPU 301 of the notification management server 110 confirms whether the re-send request is attached with any of the destination identifiers included in the destination-specific notification list 400 as a re-send destination identifier for identifying the destination to which the notification is to be re-sent. The CPU 301 of the notification management server 110 determines "NO" and ends the processing if the re-send request is attached with no such destination identifier, and determines "YES" and advances the processing to S903 if the re-send request is attached with such a destination identifier.

Next, in S903, the CPU 301 of the notification management server 110 confirms whether the re-send request is attached with range specifying information. The range specifying information is, for example, a pair of a received notification identifier and a sent notification identifier described above. The CPU 301 of the notification management server 110 determines "NO" and ends the processing if the re-send request is attached with no range specifying information and determines "YES" and advances the processing to S904 if the re-send request is attached with range specifying information.

In S904, the CPU 301 of the notification management server 110 executes predetermined processing to searches the destination-specific notification list 400 for a sent notification identifier which will be used as a self notification identifier included in a notification that needs to be re-sent.

Specifically, first, from the sent notification identifier lists 402-1 to 402-*n* in the destination-specific notification list 400, the CPU 301 of the notification management server 110 selects, as a search target, a sent notification identifier list 402-*i* corresponding to the destination identifier assigned to the application that issued the re-send request. Then, from the sent notification identifiers included in the sent notification identifier list 402-*i*, the CPU 301 of the notification management server 110 selects, as a start-point sent notification identifier, a sent notification identifier at a position following the sent notification identifier having the same value as the received notification identifier attached to the re-sending notification request. Also, from the sent notification identifiers included in the selected sent notification identifier list 402-*i*, the CPU 301 of the notification management server 110 selects, as an end-point sent notification identifier, a sent notification identifier having the same value as the sent notification identifier attached to the re-send request. Then, the CPU 301 of the notification management server 110 obtains, from the selected sent notification identifier list 402-*i*, sent notification identifiers in the range from the start-point sent notification identifier to the end-point sent notification identifier.

Also, the notification management server 110 may use a different method to identify a notification to be re-sent based on a pair of a received notification identifier and a self notification identifier, the different method being almost the same as the method described above but different in the following point. In the method described above, as described above, the sent notification identifier having the same value as the sent notification identifier attached to the re-send request is selected as an end-point sent notification identifier from the sent notification identifiers included in the sent notification identifier list 402-*i* selected. In contrast, in the different method, the end-point sent notification identifier is selected as follows. Specifically, a sent notification identifier preceding the sent notification identifier having the same value as the self notification identifier attached to the re-send request is selected as an end-point sent notification identifier from the sent notification identifiers included in the sent notification identifier list 402-*i*.

If the CPU 301 of the notification management server 110 cannot obtain any sent notification identifier in S904, the CPU 301 of the notification management server 110 determines "NO" in S905 and ends the processing. Meanwhile, if the CPU 301 of the notification management server 110 can obtain at least one sent notification identifier in S904, the CPU 301 of the notification management server 110 determines "YES" in S905 and advances the processing to S906.

In S906, the CPU 301 of the notification management server 110 executes processing to obtain, from the notification content list 500, a notification content corresponding to each of the at least one sent notification identifier obtained in S904. More specifically, the CPU 301 of the notification management server 110 searches the notification content list 500 for a self notification identifier having the same value as each of the at least one sent notification identifier obtained in S904. Then, the CPU 301 of the notification management server 110 obtains, from the notification content list 500, the notification content corresponding to the self notification identifier thus searched for.

If the CPU 301 of the notification management server 110 cannot obtain any notification content from the notification content from the notification content list 500 in S906, the CPU 301 of the notification management server 110 determines "NO" in S907 and ends the processing. Meanwhile, if the CPU 301 of the notification management server 110 can obtain at least one notification content from the notification content list 500 in S906, the CPU 301 of the notification management server 110 determines "YES" in S907 and advances the processing to S908.

In S908, the CPU 301 of the notification management server 110 re-sends at least one notification to a destination application 102. The destination application 102 is the application 102 identified based on the re-send destination identifier confirmed in S902. Also, each notification includes at least one notification content 502 obtained in S906. Each notification further includes the self notification identifier 501 corresponding to the notification content 502 in the notification content list 500. Further, each notification includes, as the sent notification identifier 202, the sent notification identifier preceding the sent notification identifier which is the same as the self notification identifier 501, wherein the sent notification identifiers are included in the sent notification identifier list 402-*i* which is included in the destination-specific notification list 400 and which corresponds to the relevant destination identifier.

In the configuration thus described, the notification management server 110 includes, in a push notification sent to a destination application 102, the self notification identifier 201 and the sent notification identifier 202 as part of the notification information 200. Then, upon receipt of the push notification, the application 102 compares the sent notification identifier 202 included in the push notification attached with the received notification identifier held in the received notification identifier holding unit 103. The received notification identifier held in the received notification identifier holding unit 103 is the self notification identifier included in the push notification received most recently. If they are not the same as a result of the comparison, the application 102 sends a re-send request to the notification management server 110. In response to this, the notification management server 110 re-sends a push notification via the push notification server 120.

Thus, after going back online, the application 102 can obtain, by the re-send, the push notification that was sent from the notification management server 110 while the application 102 was offline. Also, because the re-send request is made only in a case where there is an unreceived push notification, the communication load can be reduced compared to a case where a reception response is performed for every push notification.

Figure 10:
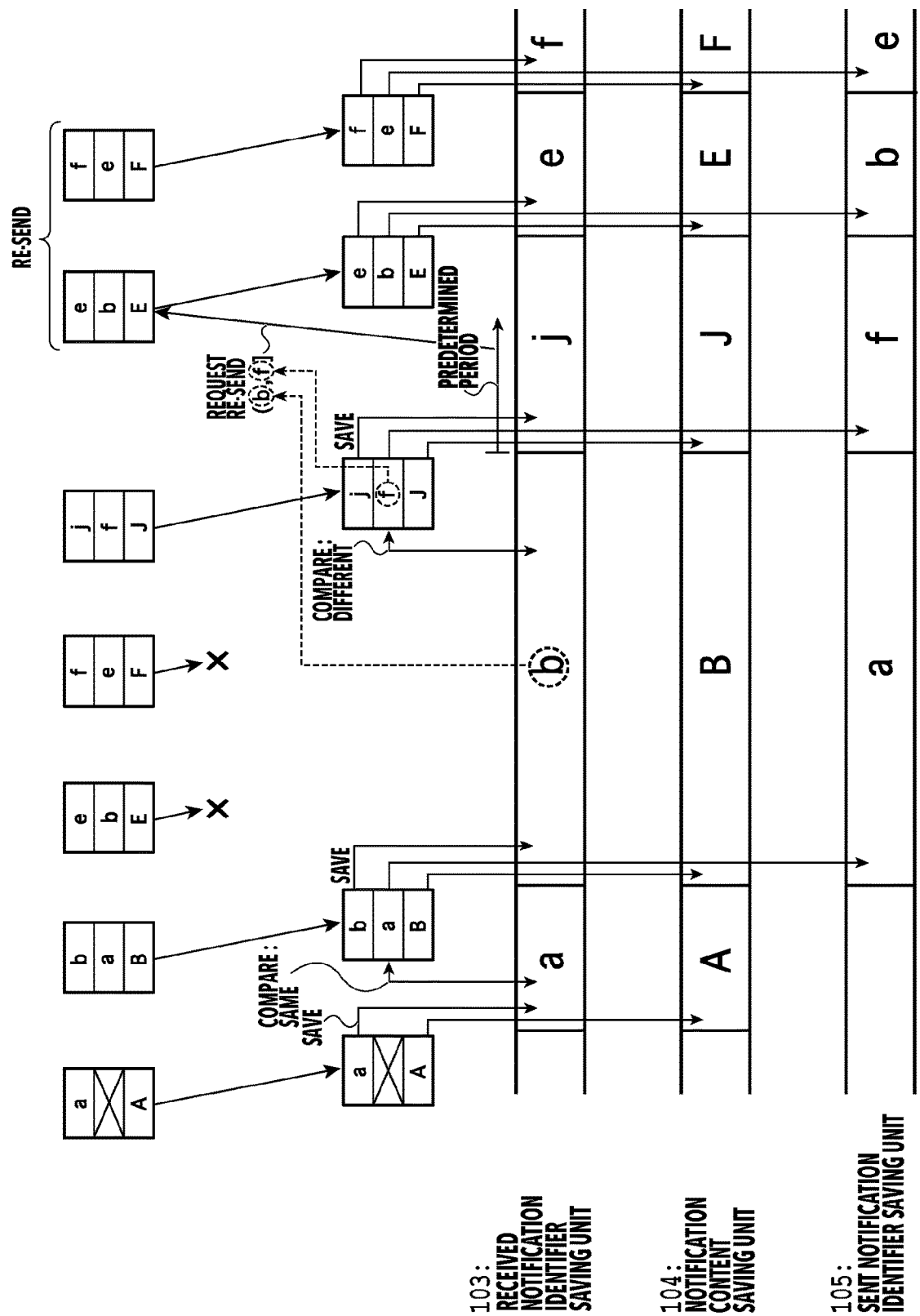
FIG. 10 is a timing diagram showing Operation Example 1 of the notification delivery system of the first embodiment.

[Operation Example 1] Notification is Re-Sent Due to the Application Being Offline FIG. 10 is a timing chart showing Operation Example 1. Referring to FIG. 10, the notification management server 110 sends push notifications to a destination application 102 assigned with "001" as a destination identifier 401 in the following order. First, a push notification attached with a self notification identifier "a" is sent. Next, a push notification attached with a self notification identifier "b" is sent. Next, a push notification attached with a self notification identifier "e" is sent. Next, a push notification attached with a self notification identifier "f" is sent. Next, a push notification attached with a self notification identifier "j" is sent.

Note that the push notification attached with "b" as the self notification identifier and the push notifications after that are further attached with "a," "b," "e," and "f" as respective sent notification identifiers.

The destination application 102 is offline in a period in which the notification management server 110 sends the push notification attached with the self notification identifier "e" and the push notification attached with the self notification identifier "f."

Once the first push notification, i.e., the push notification attached with the self notification identifier "a," arrives at the destination application 102, "a" is held in the received notification identifier holding unit 103 as a received notification identifier.

Once the push notification attached with the self notification identifier "b" arrives at the destination application 102, "a" as the received notification identifier is compared with "a" as the sent notification identifier, and they are the same. Thus, the destination application 102 does not send a re-send request. Meanwhile, in the received notification identifier holding unit 103, "a" as the received notification identifier is updated to "b."

Since the push notification attached with the self notification identifier "e" and the push notification attached with the self notification identifier "f" do not arrive at the destination application 102, "b" as the received notification identifier remains held in the received notification identifier holding unit 103.

Once the push notification attached with the self notification identifier "j" arrives at the application 102, "b" as the received notification identifier is compared with "f" as the sent notification identifier, and they are not the same. Also, the next push notification does not arrive within a certain period of time. Thus, the destination application 102 issues a re-send request to the notification management server 110. The re-send request has the received notification identifier "b" and the sent notification identifier "f" attached thereto. Also, in the received notification identifier holding unit 103, "b" as the received notification identifier is updated to "j."

Upon receipt of the re-send request, the notification management server 110 refers to the sent notification identifier list 402-1, which is in the column corresponding to the destination identifier "001," in the destination-specific notification list 400. Then, the notification management server 110 obtains "e" and "f," which are in the range from the notification identifier "e" following the received notification identifier "b" attached to the re-send request to the sent notification identifier "f" attached to the re-send request. Then, the notification management server 110 refers to the notification content list 500, obtains the notification contents "E" and "F" corresponding to the self notification identifiers "e" and "f," respectively, and re-sends two push notifications respectively including {"e", "b", "E"} and {"f", "e", "F"} to the destination application 102.

Figure 11:
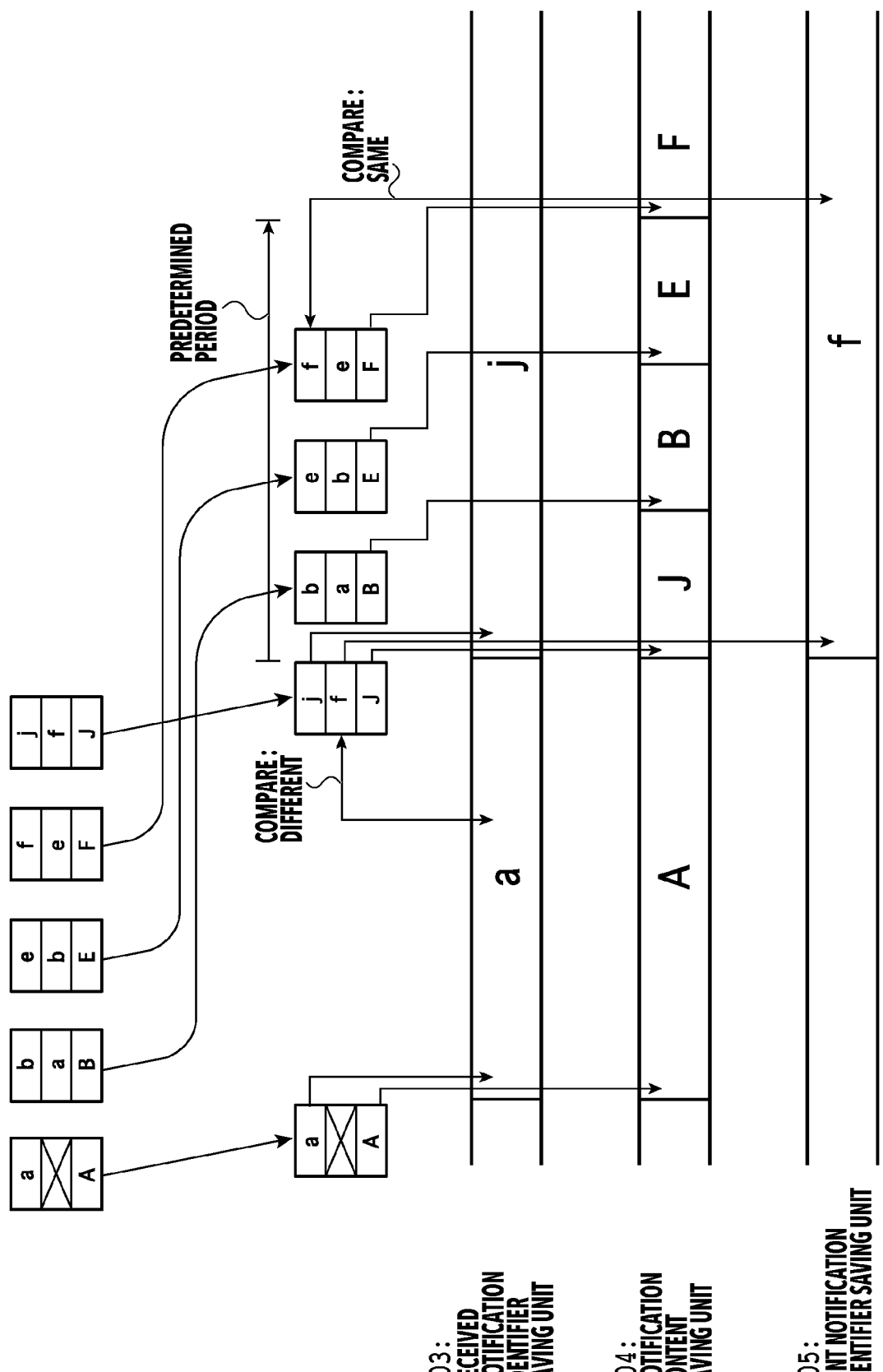
FIG. 11 is a timing diagram showing Operation Example 2 of the notification delivery system of the first embodiment.

[Operation Example 2] Notification is not Re-Sent Although Push Notifications are Switched FIG. 11 is a timing chart showing Operation Example 2. Referring to FIG. 11, the notification management server 110 sends push notifications to a destination application 102 assigned with "001" as a destination identifier 401 in the following order. First, a push notification attached with a self notification identifier "a" is sent. Next, a push notification attached with a self notification identifier "b" is sent. Next, a push notification attached with a self notification identifier "e" is sent. Next, a push notification attached with a self notification identifier "f" is sent. Next, a push notification attached with a self notification identifier "j" is sent.

Note that the push notification attached with "b" as the self notification identifier and the push notifications after that are further attached with "a," "b," "e," and "f" as respective sent notification identifiers.

Due to differences between the notifications in their delay time at the push notification server 120 or on the Internet 130, the destination application 102 assigned with "001" as the destination identifier 401 receives the push notifications with the self notification identifiers "a" and "j" consecutively.

Once the first push notification, i.e., the push notification attached with the self notification identifier "a," arrives at the destination application 102, "a" is held in the received notification identifier holding unit 103 as a received notification identifier.

Next, once the push notification attached with the self notification identifier "j" is received by the destination application 102, "a" as the received notification identifier is compared with "f" as the sent notification identifier, and they are not the same.

Then, "f" as the sent notification identifier is held in the sent notification identifier holding unit 105.

Within a certain period of time after that, the destination application 102 receives the push notification attached with the self notification identifier "b," the push notification attached with the self notification identifier "e," and the push notification attached with the self notification identifier "f" in this order.

Then, "f" as the self notification identifier of the latest one of the three new push notifications that are received by the destination application 102 within the certain period of time is compared with "f" as the sent notification identifier held in the sent notification identifier holding unit 105. Since they are the same, the destination application 102 does not issue a re-send request.

Figure 12:
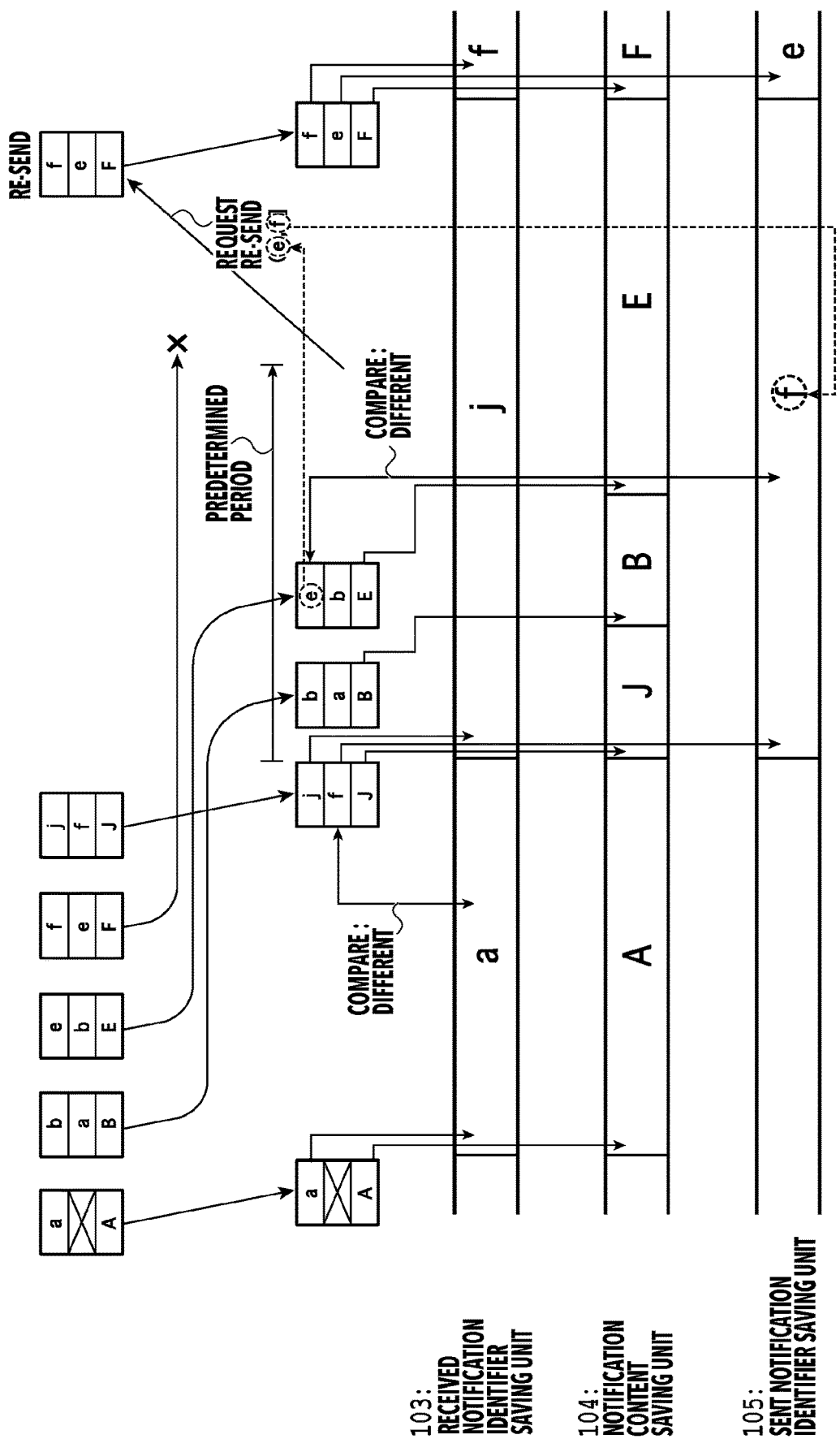
FIG. 12 is a timing diagram showing Operation Example 3 of the notification delivery system of the first embodiment.

[Operation Example 3] One Notification is Re-Sent Due to Switching of Push Notifications FIG. 12 is a timing chart showing Operation Example 3. Referring to FIG. 12, the notification management server 110 sends push notifications to a destination application 102 assigned with "001" as the destination identifier 401 in the following order. First, a push notification attached with a self notification identifier "a" is sent. Next, a push notification attached with a self notification identifier "b" is sent. Next, a push notification attached with a self notification identifier "e" is sent. Next, a push notification attached with a self notification identifier "f" is sent. Next, a push notification attached with a self notification identifier "j" is sent.

Note that the push notification attached with "b" as the self notification identifier and the push notifications after that are further attached with "a," "b," "e," and "f" as respective sent notification identifiers.

Due to differences between the notifications in their delay time at the push notification server 120 or on the Internet 130, the destination application 102 assigned with "001" as the destination identifier 401 receives the push notifications with the self notification identifiers "a" and "j" consecutively.

Once the first push notification, i.e., the push notification attached with the self notification identifier "a," arrives at the destination application 102, "a" is held in the received notification identifier holding unit 103 as the received notification identifier.

Next, once the push notification attached with the self notification identifier "j" is received by the destination application 102, "a" as the received notification identifier is compared with "f" as the sent notification identifier, and they are not the same. Then, "f" as the sent notification identifier is held in the sent notification identifier holding unit 105.

Within a certain period of time after that, the destination application 102 receives the push notification attached with the self notification identifier "b" and the push notification attached with the self notification identifier "e" in this order. The application 102 does not receive the push notification attached with the self notification identifier "f" within the certain period of time.

Then, "e" as the self notification identifier of the latest one of the two new push notifications that are received by the destination application 102 within the certain period of time is compared with "f" as the sent notification identifier held in the sent notification identifier holding unit 105. Since they are not the same, the destination application 102 sends a re-send request.

The re-send request is attached with the new push notification identifier "e" and the sent notification identifier "f."

Upon receipt of the re-send request, the notification management server 110 refers to the sent notification identifier list 402-1, which is in the column corresponding to the destination identifier "001," in the destination-specific notification list 400. Then, the notification management server 110 obtains "f," which is in the range from the notification identifier "f" following the received notification identifier "e" to the sent notification identifier "f." Then, the notification management server 110 refers to the notification content list 500, obtains the notification content "F" corresponding to the self notification identifier "f," and re-sends a push notification including {"f", "e", "F"} to the destination application 102.

Figure 13:
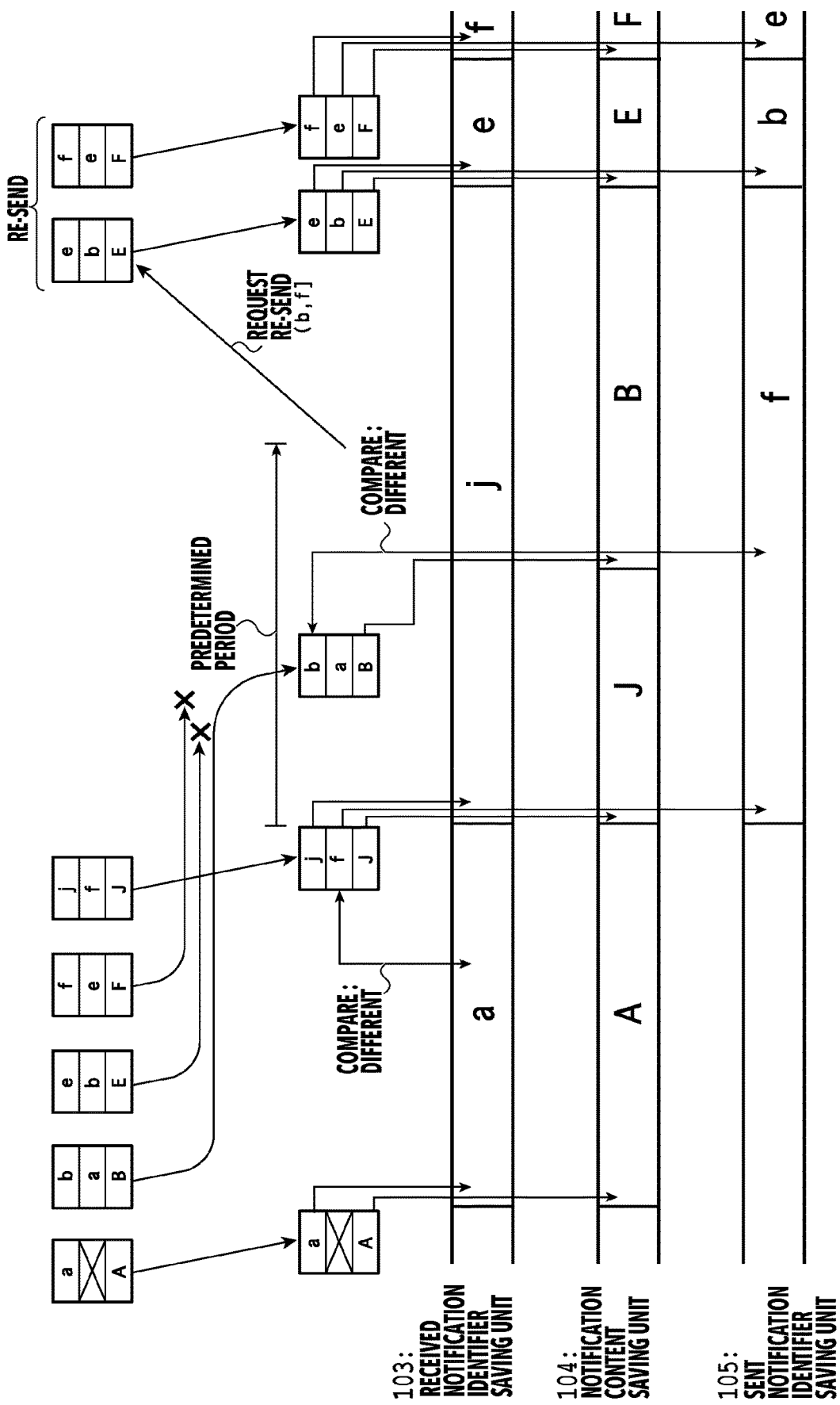
FIG. 13 is a timing diagram showing Operation Example 4 of the notification delivery system of the first embodiment.

[Operation Example 4] Two Notifications are Re-Sent Due to Switching of Notifications FIG. 13 is a timing chart showing Operation Example 4. Referring to FIG. 13, the notification management server 110 sends push notifications to a destination application 102 assigned with "001" as the destination identifier 401 in the following order. First, a push notification attached with a self notification identifier "a" is sent. Next, a push notification attached with a self notification identifier "b" is sent. Next, a push notification attached with a self notification identifier "e" is sent. Next, a push notification attached with a self notification identifier "f" is sent. Next, a push notification attached with a self notification identifier "j" is sent.

Note that the push notification attached with the self notification identifier "b" and the push notifications after that are further attached with "a," "b," "e," and "f" as respective sent notification identifiers.

Here, due to differences between the notifications in their delay time at the push notification server 120 or on the Internet 130, the destination application 102 assigned with "001" as the destination identifier 401 receives the push notifications with the self notification identifiers "a" and "j" consecutively.

Once the first push notification, i.e., the push notification attached with the self notification identifier "a," arrives at the destination application 102, "a" is held in the received notification identifier holding unit 103 as the received notification identifier.

Next, once the push notification attached with the self notification identifier "j" is received by the destination application 102, "a" as the received notification identifier is compared with "f" as the sent notification identifier, and they are not the same.

Then, "f" as the sent notification identifier is held in the sent notification identifier holding unit 105.

Within a certain period of time after that, the destination application 102 receives the push notification attached with the self notification identifier "b." The application 102 does not receive the push notification attached with the self notification identifier "e" and the push notification attached with the self notification identifier "f" within the certain period of time.

Then, "b" as the self notification identifier of the sole new push notification that is received by the destination application 102 within the certain period of time (a new push notification identifier) is compared with "f" as the sent notification identifier held in the sent notification identifier holding unit 105. Since they are not the same, the destination application 102 sends a re-send request.

The re-send request is attached with the new push notification identifier "b" and the sent notification identifier "f."

Upon receipt of the re-send request, the notification management server 110 refers to the sent notification identifier list 402-1, which is in the column corresponding to the destination identifier "001," in the destination-specific notification list 400. Then, the notification management server 110 obtains "e" and "f," which are in the range from the notification identifier "e" following the received notification identifier "b" to the sent notification identifier "f." Then, the notification management server 110 refers to the notification content list 500, obtains the notification contents "E" and "F" corresponding to the notification identifiers "e" and "f," respectively, and re-sends two push notifications respectively including {"e", "b", "E"} and {"f", "e", "F"} to the destination application 102.

Second Embodiment

In the first embodiment, self notification identifiers are issued to uniquely identify notification contents and also identify the order in which the notification contents were sent, sent notification identifiers and received notification identifiers are generated based on the self notification identifiers, and they are used in re-sending notifications. However, there are cases where self notification identifiers issued can uniquely identify notification contents, but cannot identify the order in which the notification contents were sent. An example of such a case is using random numerical values as self notification identifiers. Proper notification re-sending processing cannot be performed in a case where the first embodiment uses such self notification identifiers and sent and received notification identifiers generated based on the self notification identifiers. For example, in a case where a sent notification identifier and a received notification identifier are not the same in the application 102, it does not necessarily mean that there is an unreceived push notification. Also, using a pair of a sent notification identifier and a received notification identifier as range notification information does not enable the notification management server 110 to identify notifications that need to be re-sent.

Thus, the present embodiment overcomes this problem by using both of a self notification identifier which can uniquely identify a notification content but cannot identify the sending ordinal position of the notification content and an ordinal position identifier which can identify the sending ordinal position of the notification content. The overall configuration of the notification delivery system of the present embodiment is basically the same as that of the first embodiment, and thus, differences between them are only described.

Figure 14:
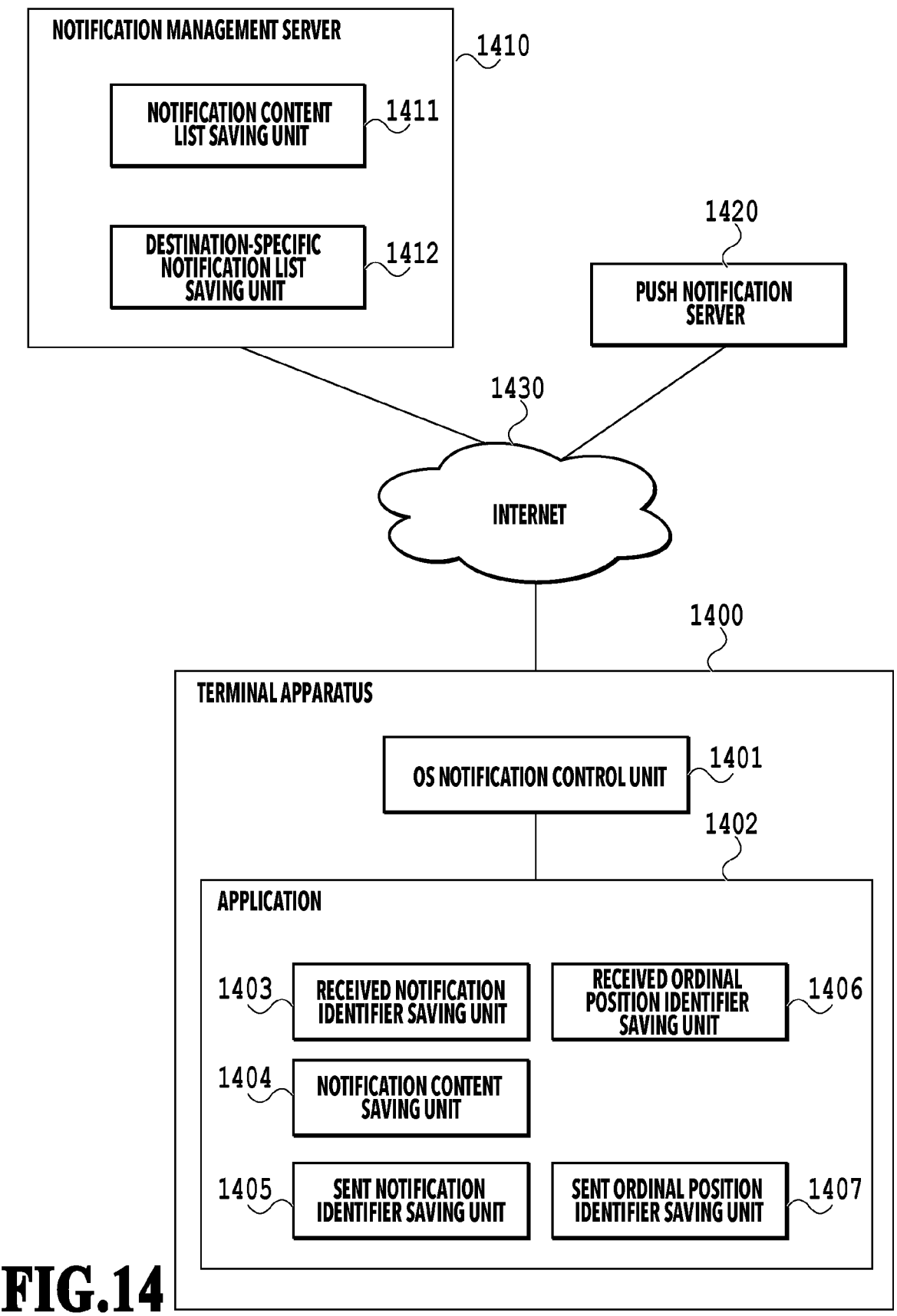
FIG. 14 is a diagram of the configuration of a notification delivery system of a second embodiment.

FIG. 14 is a diagram showing an example of the overall configuration of the notification delivery system of the present embodiment.

In the first embodiment, the application 102 has the received notification identifier holding unit 103, the notification content holding unit 104, and the sent notification identifier holding unit 105. In contrast, in the present embodiment, an application 1402 has a received ordinal position identifier holding unit 1406 and a sent ordinal position identifier holding unit 1407 in addition to a received notification identifier holding unit 1403, a notification content holding unit 1404, and a sent notification identifier holding unit 1405.

Also, a notification content list 1700 held in a notification content list holding unit 1411 of a notification management server 1410 of the present embodiment is different from the notification content list 500 held in the notification content list holding unit 111 of the notification management server 110 of the first embodiment.

Further, a destination-specific notification list 1600 (see FIG. 16) held in a destination-specific notification list holding unit 1412 of the present embodiment is different from the destination-specific notification list 400 held in the destination-specific notification list holding unit 112 of the first embodiment.

A terminal apparatus 1400 and the notification management server 1410 of the present embodiment basically have a configuration similar to that of the first embodiment that is as shown in FIG. 3.

Basically, the notification delivery system of the present embodiment operates in a manner similar to that of the first embodiment that is as shown in FIG. 6.

Figure 15:
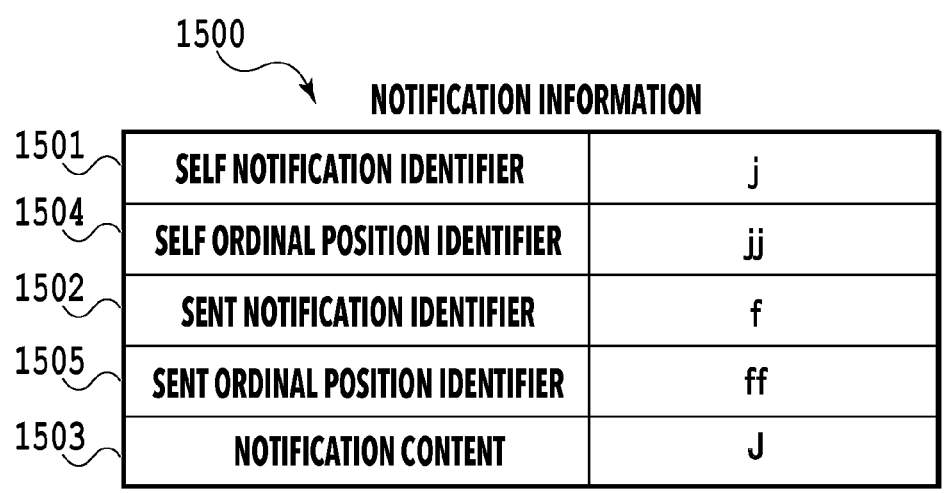
FIG. 15 is a diagram showing the configuration of notification information in the second embodiment.

Referring to FIG. 15, notification information 1500 includes a self notification identifier 1501, a sent notification identifier 1502, a notification content 1503, a self ordinal position identifier 1504, and a sent ordinal position identifier 1505. The notification content 1503 is a content to be notified from the notification management server 1410 to the application 1402. The self notification identifier 1501 is an identifier uniquely attached to each notification content 1503, but unlike the self notification identifier in the first embodiment, does not indicate the ordinal position of the notification content 1503 sent from the notification management server 1410 toward the application 1402. The sent notification identifier 1502 is the self notification identifier attached to the notification content 1503 which was sent the last time. The self ordinal position identifier 1504 is an identifier indicating the ordinal position of the notification content 1503 sent from the notification management server 1410 toward the application 1402. The sent ordinal position identifier 1505 is the self ordinal position identifier attached to the notification content 1503 that was sent the last time.

Figure 16:
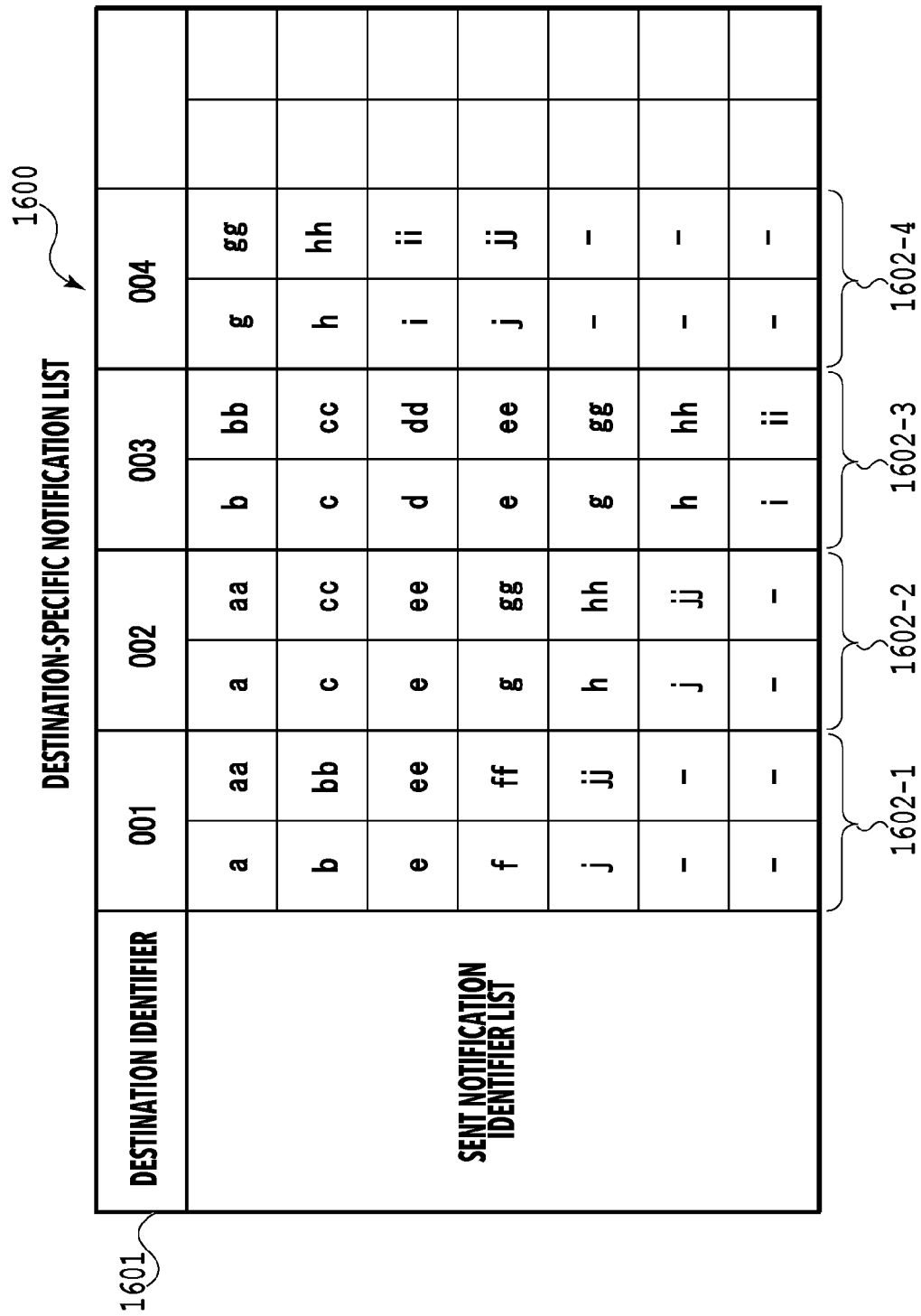
FIG. 16 is a diagram showing an example of a destination-specific notification list in the second embodiment.

Referring to FIG. 16, the destination-specific notification list 1600 held in the destination-specific notification list holding unit 1412 has a plurality of columns for the respective destinations. The columns have sent notification identifier lists 1602-1, 1602-2, . . . 1602-n corresponding to the respective destinations. Each sent notification identifier list 1602-i includes a plurality of entries, each of which is attached with a pair of a sent notification identifier and a sent ordinal position identifier.

For instance, pairs with values {a, aa}, {b, bb}, {e, ee}, {f, ff}, and {j, jj} are attached to the entries for the sent notification identifier list 1602-1 corresponding to the destination assigned with the identifier "001" This indicates that notifications attached with {a, aa}, {b, bb}, {e, ee}, {f, ff}, and {j, jj} as pairs of a self notification identifier and a self ordinal position identifier have been sent to the destination assigned with the identifier "001"

Referring to FIG. 17, the notification content list 1700 held in the notification content list holding unit 1411 has a plurality of entries each having a set of a self notification identifier 1701, a self ordinal position identifier 1703, and a notification content 1702.

In the example in FIG. 17, the sets of the self notification identifier 1701, the self ordinal position identifier 1703, and the notification content 1702 are, from top down, (a, aa, A), (b, bb, B), (c, cc, C), and so on. These sets indicate that a notification content "A" was first generated and attached with a self notification identifier "a" and a self ordinal position identifier "aa," a notification content "B" was next generated and attached with a self notification identifier "b" and a self ordinal position identifier "bb," a notification content "C" was then generated and attached with a self notification identifier "c" and a self ordinal position identifier "cc," and a similar process was repeated.

FIGS. 16 and 17 indicate that the notification content "A" attached with the self notification identifier "a" and the self ordinal position identifier "aa" and the notification content "B" attached with the self notification identifier "b" and the self ordinal position identifier "bb" were sent to the destination assigned with the destination identifier "001," and then after that, a notification content "E" attached with a self notification identifier "e" and a self ordinal position identifier "ee," a notification content "F" attached with a self notification identifier "f" and a self ordinal position identifier "ff," and so on were sent to the destination assigned with the destination identifier "001." Meanwhile, FIGS. 16 and 17 indicate that a notification content "C" attached with a self notification identifier "c" and a self ordinal position identifier "cc" and a notification content "D" attached with a self notification identifier "d" and a self ordinal position identifier "dd" were not sent to the destination assigned with the destination identifier "001."

Figure 18:
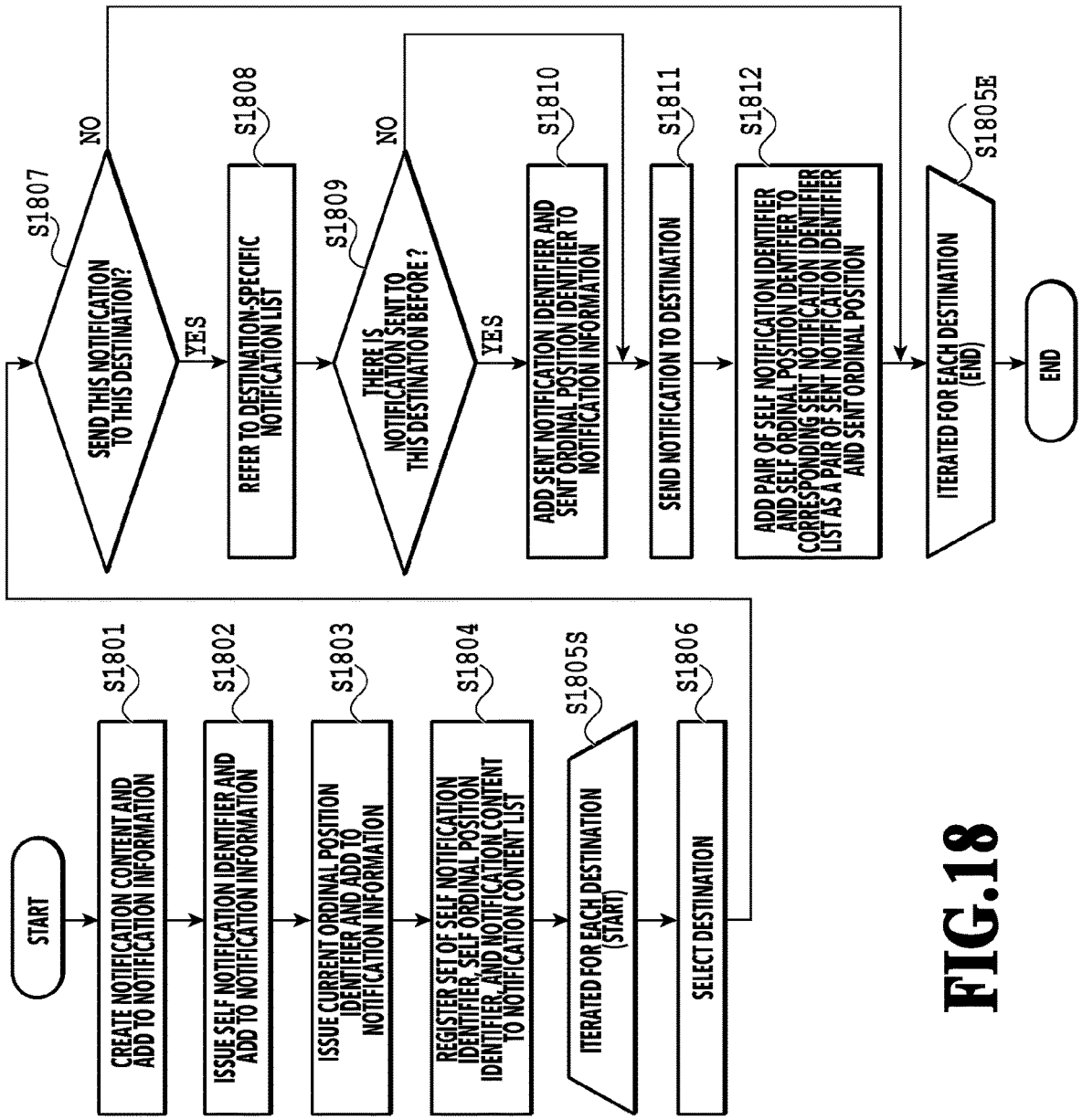
FIG. 18 is a flowchart showing sending processing performed by a notification management server in the second embodiment.

FIG. 18 is a flowchart showing processing performed by the notification management server 1410. The processing starts with creating a new notification content and ends with sending the notification to a push notification server 1420. First, in S1801, the CPU 301 of the notification management server 1410 creates a new notification content. Examples of the new notification content include a content to be displayed on the screen of the terminal apparatus 1400 and a content to be supplied to the application 1402.

After creating the new notification content, in S1802, the CPU 301 of the notification management server 1410 issues anew notification identifier uniquely defined for the notification content as a self notification identifier and attaches the self notification identifier to the new notification content.

The self notification identifier enables unique identification of the notification content. However, unlike the first embodiment, the self notification identifier does not conform to such a format that enables identification of the ordinal position of the notification content based on the self notification identifier. In other words, the self notification identifier enables identification of the notification itself, but does not enable identification of the sending ordinal position of the notification content.

Next, in S1803, the CPU 301 of the notification management server 1410 generates an issuance time for the self notification identifier as a self ordinal position identifier and attaches this self ordinal position identifier to the notification information. The self ordinal position identifier attached here may be any identifier as long as it enables identification of the position of the push notification in the order in which push notifications were created. Thus, examples of what can be used as the self ordinal position identifier include an integer which is incremented by one every time the processing in FIG. 18 is performed or any kind of ordinal number which is increased in ordinal position every time the processing in FIG. 18 is performed. Also, although border processing (e.g., most significant bit (MSB) inversion) needs to be added, a finite number of self ordinal position identifiers can be repeatedly utilized.

Thus, in a case where different notification contents are mixed, they can be rearranged in the order in which they were sent based on their self ordinal position identifiers. Note that the order in which notification contents are issued is the same as the order in which notification contents are sent. Thus, a self ordinal position identifier enables identification of both the issuance ordinal position and the sending ordinal position of a notification content commonly.

Next, in S1804, the CPU 301 of the notification management server 1410 takes a set of the new self notification identifier, the self ordinal position identifier, and the notification content and registers the set in the notification content list 1700 shown in FIG. 17 as a new entry.

Next, S1805S to S1805E are iterated for each destination.

In each iteration, first, in S1806, the CPU 301 of the notification management server 1410 selects a destination for the current iteration.

In the present embodiment, as a destination, the service provider can set a combination of an application, a terminal apparatus having the application, and a user logged in to use the application. The notification management server 1410 determines a destination based on this setting.

Next, in S1807, the CPU 301 of the notification management server 1410 confirms whether the destination selected in S1806 is the notification destination of the notification content created in S1801 in the current sequence. If so (Y), the CPU 301 of the notification management server 1410 advances the processing to S1808, and if not (NO), the current iteration is ended.

In S1808, the CPU 301 of the notification management server 1410 refers to the destination-specific notification list 1600 shown in FIG. 16. By using the destination-specific notification list 1600 held in the destination-specific notification list holding unit 1412, the CPU 301 of the notification management server 1410 manages pairs of sent notification identifiers and sent ordinal position identifiers corresponding to notification contents already sent to destinations.

In S1809, based on the sent notification identifier list 1602-i held in the destination-specific notification list 1600, the CPU 301 of the notification management server 1410 confirms whether a push notification has been sent to the destination in the past. Specifically, the determination is made based on whether the sent notification identifier list 1602-i in the destination-specific notification list 1600 corresponding to the destination has stored therein a sent ordinal position identifier indicating a sending ordinal position temporally before the self ordinal position identifier issued in S1803.

If there is a push notification that has been sent to the destination in the past, the CPU 301 of the notification management server 1410 determines "YES" in S1809 and attaches the latest sent notification identifier and the latest sent ordinal position identifier to the notification information 1500 in S1810. As a result, as shown in FIG. 15, the notification information 1500 includes the self notification identifier 1501, the self ordinal position identifier 1504, the sent notification identifier 1502, the sent ordinal position identifier 1505, and the notification content 1503.

If no push notification has been sent to the destination in the past, the CPU 301 of the notification management server 1410 determines "NO" in S1809 and bypasses S1810. Thus, in a case where no push notification has been sent in the past, the notification information 1500 includes the self notification identifier 1501, the self ordinal position identifier 1504, and the notification content 1503, but does not include the sent notification identifier 1502 and the sent ordinal position identifier 1505.

Next, in S1811, the CPU 301 of the notification management server 1410 sends the new notification information 1500 including the notification content 1503, the self notification identifier 1501, the self ordinal position identifier 1504, the sent notification identifier 1502, and the sent ordinal position identifier 1505. Alternatively, the CPU 301 of the notification management server 1410 sends the new notification information 1500 including the notification content 1503, the self notification identifier 1501, and the self ordinal position identifier 1504 but not including the sent notification identifier 1502 and the sent ordinal position identifier 1505. Upon receipt of the new notification information 1500, the push notification server 1420, based on this, sends a push notification including the new notification information 1500 to the notification destination.

Finally, in S1812, the CPU 301 of the notification management server 1410 adds the pair of the self notification identifier and the self ordinal position identifier to the sent notification identifier list 1602-i as a pair of a sent notification identifier and a sent ordinal position identifier.

Figure 19B:
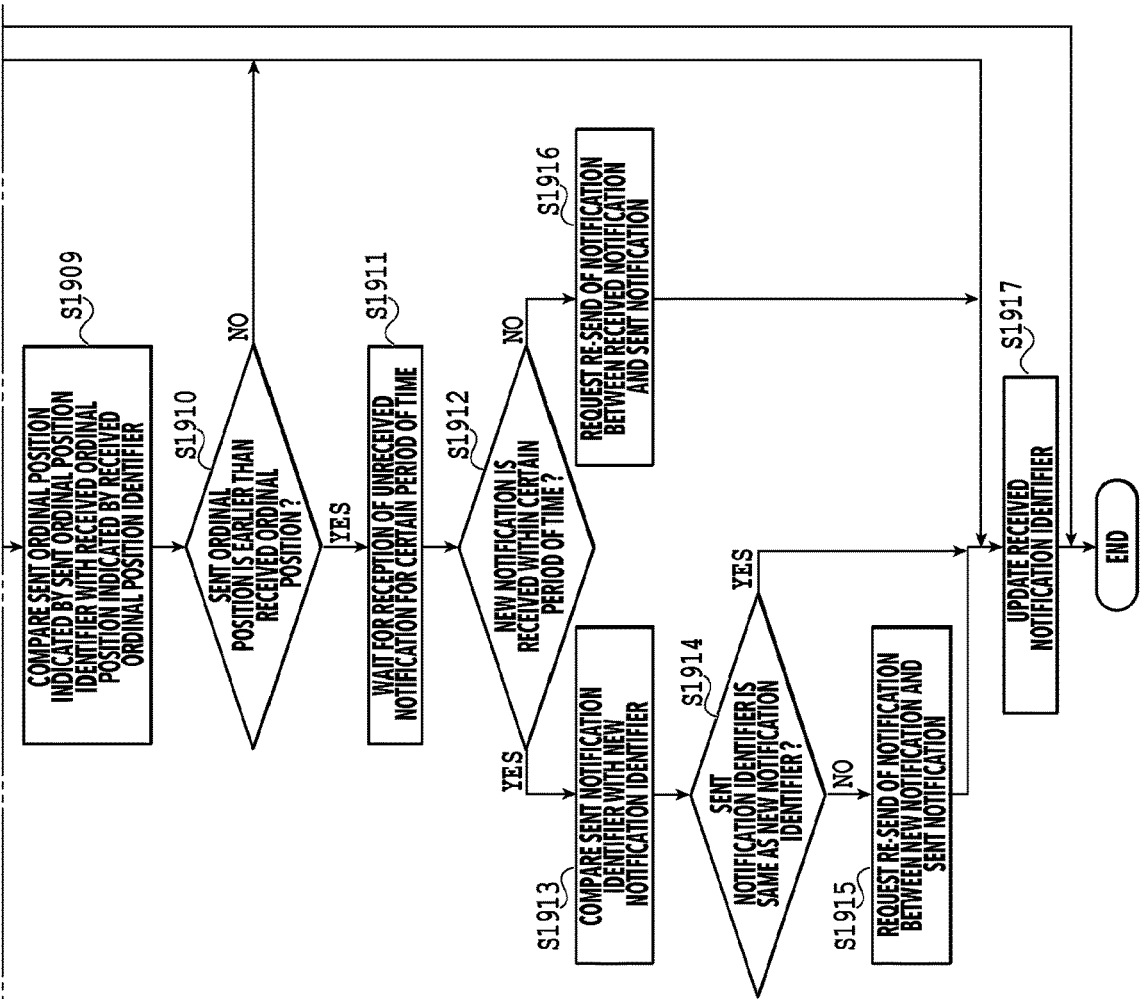

FIGS. 19A and 19B constitute a flowchart showing processing performed by the application 1402 upon receipt of a push notification, the application 1402 being implemented by program execution by the CPU 301 of the terminal apparatus 1400. First, in S1901, the application 1402 is informed by an OS notification control unit 1401 that a notification has been received and receives the notification through a process executable upon receipt of a notification, which is registered in the application 1402.

How to handle the notification content 1503 included in the notification received is the same as the first embodiment and iterated explanation thereof is omitted.

Next, in S1902, the CPU 301 executing the application 1402 confirms whether a self ordinal position identifier 1504 is attached to the received notification as part of the notification information 1500.

If a self ordinal position identifier 1504 is not attached to the received notification as part of the notification information 1500, the CPU 301 executing the application 1402 determines "NO" in S1902 and ends the processing.

If a self ordinal position identifier 1504 is attached to the received notification as part of the notification information 1500, the CPU 301 executing the application 1402 determines "YES" in S1902 and advances the processing to S1903.

In S1903, the CPU 301 executing the application 1402 compares the ordinal position indicated by the self ordinal position identifier 1504 in the notification received this time with the ordinal position indicated by the latest received ordinal position identifier held in the received ordinal position identifier holding unit 1406.

In S1904, in a case where the self ordinal position identifier 1504 in the notification received this time indicates an ordinal position which is temporally after the latest received ordinal position identifier, it means that the notification received in S1901 in the current sequence is a notification that is received for the first time. Thus, in this case, the CPU 301 executing the application 1402 determines "YES" in S1904 and advances the processing to S1905. If not, it means that processing related to the notification received this time has already been completed. Thus, the CPU 301 executing the application 1402 determines "NO" in S1904 and ends the processing.

Next, in S1905, the CPU 301 executing the application 1402 confirms whether the notification information 1500 includes a sent notification identifier 1502. In a case where the push notification received this time is the first notification, the notification information 1500 does not include a sent notification identifier 1502. In the other case, the notification information 1500 includes a sent notification identifier 1502.

If the notification information 1500 includes a sent notification identifier 1502, the CPU 301 executing the application 1402 confirms "YES" in S1905 and advances the processing to S1906. If not, the CPU 301 executing the application 1402 determines "NO" and advances the processing to S1917.

In S1906, the CPU 301 executing the application 1402 stores the sent notification identifier 1502 and the sent ordinal position identifier 1505 in the notification received in S1901 to the sent notification identifier holding unit 1405 and the sent ordinal position identifier holding unit 1407, respectively.

Next, in S1907, the CPU 301 executing the application 1402 compares the sent notification identifier 1502 included in the notification information 1500 with the latest received notification identifier held in the received notification identifier holding unit 1403.

In a case where the sent notification identifier 1502 included in the notification information 1500 received this time is the same as the latest received notification identifier in S1907, it means that the application 1402 received the notification that was sent from the notification management server 1410 to the application 102 most recently. Since a re-send request is unneeded in this case, the CPU 301 executing the application 1402 determines "NO" in S1908 and advances the processing to S1917.

In S1907, in a case where the sent notification identifier 1502 included in the notification information 1500 received this time is different from the latest received notification identifier, it may mean that the received ordinal position identifier indicates an ordinal position temporally before the sent ordinal position identifier 1505. Thus, in such a case, the CPU 301 executing the application 1402 determines "YES" in S1908 and advances the processing to S1909.

In S1909, the CPU 301 executing the application 1402 compares the ordinal position indicated by the sent ordinal position identifier with the ordinal position indicated by the received ordinal position identifier. The sent ordinal position identifier is included in the notification received in S1901, and the received ordinal position identifier is held in the received ordinal position identifier holding unit 1406.

In a case where the received ordinal position identifier indicates an ordinal position temporally before that of the sent ordinal position identifier, it means that there is notification information which has been sent from the notification management server 1410 but not received by the application 1402. Thus, the CPU 301 executing the application 1402 determines "YES" in S1910 and advances the processing to S1911. In the other case, the CPU 301 executing the application 1402 determines "NO" in S1910, and advances the processing to S1917.

There are two possible reasons why there is a push notification which has been sent from the notification management server 1410 but not received by the application 1402.

The first reason is that the push notification was sent from the notification management server 1410 in a period in which the application 1402 was offline. The second reason is that the order of arrival of the notifications at the application 1402 was switched due to differences between the notifications in their delay time at the push notification server 1420 or on the Internet 1430.

In S1911, to deal with the second reason, the CPU 301 executing the application 1402 waits for receipt of an unreceived notification for a predetermined period of time. If receiving a new push notification within the predetermined period of time, the CPU 301 executing the application 1402 determines "YES" in S1912 and advances the processing to S1913 and onward. Meanwhile, if the CPU 301 executing the application 1402 waits for receipt of an unreceived notification for the predetermined period of time in S1911 and does not receive a new push notification within the predetermined period of time, the CPU 301 executing the application 1402 determines "NO" in S1912 and advances the processing to S1916 and onward to deal with the first reason. This is because the predetermined period of time is set appropriately so that a new push notification may be received within the predetermined period of time if the second reason is the actual reason and is not received within the predetermined period of time if the first reason is the actual reason. For example, the predetermined period of time is appropriately set within the range from several tens of seconds to several minutes.

If a new push notification is not received within the predetermined period of time, the CPU 301 executing the application 1402 determines "NO" in S1912, and requests the notification management server 1410 to re-send one or more notifications in S1916. Here, the CPU 301 of the application 1402 attaches a pair of a received notification identifier and a sent notification identifier to the re-send request as range specifying information. The received notification identifier here is the received notification identifier held in the received notification identifier holding unit 1403, and the sent notification identifier here is the sent notification identifier 1502 in the notification information 1500 included in the push notification received in S1901 in the current sequence. Note that the CPU 301 of the application 1402 may add a pair of the received notification identifier and the self notification identifier 1501 to the re-send request as range specifying information.

Meanwhile, if receiving at least one new push notification within the predetermined period of time, the CPU 301 executing the application 1402 determines "YES" in S1912, and advances the processing to S1913.

Note that, using the OS notification control unit 1401, the CPU 301 executing the application 1402 can display, on the display unit (not shown) for the user, the notification content included in the new push notification the reception of which was detected in S1912.

In S1913, the CPU 301 executing the application 1402 compares the sent notification identifier with a new notification identifier. The sent notification identifier is the sent notification identifier included in the notification received in S1901, and the new notification identifier is the self notification identifier included in the new notification the reception of which was detected in S1912.

The processing in S1913, S1914, and S1915 are the same as that in S810, S811, and S812 in the first embodiment and iterated explanation thereof is omitted.

Note that if it is determined in S1913 that the sent notification identifier and the new notification identifier are not the same, it is apparent that the new notification identifier indicates an ordinal position temporally before the sent ordinal position identifier, and thus, no comparison is made between the new notification identifier and the sent ordinal position identifier.

Finally, in S1917, the CPU 301 executing the application 1402 executes the following processing, except for a case where "NO" is determined in S1902. Specifically, the CPU 301 stores the self notification identifier 1501 included in the push notification received in S1901 at the start of the processing to the received notification identifier holding unit 1403 as a new received notification identifier, overwriting the old received notification identifier. The CPU 301 executing the application 1402 also stores the self ordinal position identifier 1504 included in the push notification received in S1901 at the start of the processing to the received ordinal position identifier holding unit 1406 as a new received ordinal position identifier, overwriting the old received ordinal position identifier.

In the present embodiment, the ordinal position identifiers (the self ordinal position identifier 1504 and the sent ordinal position identifier 1505) in the notification information 1500 are expressed in such a format that the sending ordinal position of the notification content 1503 is identifiable. Thus, it is basically possible for the destination application 1402 to determine the presence of an unreceived notification by simply storing the self notification identifier 1501 and the self ordinal position identifier 1504 included in the notification information 1500 in a push notification every time the destination application 1402 receives the push notification.

The application 1402 executes the processing described with reference to FIGS. 19A and 19B upon receipt of a notification re-sent from the notification management server 1410 as well. Thus, in a case where, for example, the application 1402 cannot receive some of a plurality of push notifications re-sent thereto, the application 1402 can request re-sending of those push notifications again.

The processing performed next by the notification management server 1410 in receiving a re-send request and re-sending a notification is the same as the processing in the first embodiment described with reference to FIG. 9, except for the processing in S904.

In S904 in the present embodiment, the CPU 301 of the notification management server 1410 executes predetermined processing to search the destination-specific notification list 1600 for a sent notification identifier to be used as a self notification identifier corresponding to a notification content that needs to be re-sent. Specifically, first, the CPU 301 of the notification management server 1410 takes a sent notification identifier list 1602-i corresponding to the destination identifier assigned to the application that issued the re-send request from the sent notification identifier lists 1602-1 to 1602-n in the destination-specific notification list 1600 and sets the sent notification identifier list 1602-i as a search target.

Then, from the sent notification identifiers included in the sent notification identifier list 1602-i, a sent notification identifier at a position following the sent notification identifier having the same value as the received notification identifier attached to the re-send request is selected as a start-point sent notification identifier, and a sent notification identifier having the same value as the sent notification identifier attached to the re-send request is selected as an end-point sent notification identifier. Then, from the sent notification identifier list 1602-i, the CPU 301 of the notification management server 1410 obtains sent notification identifiers within the range from the start-point sent notification identifier to the end-point sent notification identifier.

In the second embodiment, unlike the first embodiment, the sent notification identifier at a position following the sent notification identifier having the same value as the received notification identifier attached to the re-send request cannot be searched for based on the value of the sent notification identifier itself. Thus, in the present embodiment, as shown in FIG. 16, a reference is made to the sent ordinal position identifiers held in pairs with the sent notification identifiers in the entries of the sent notification identifier list 1602-i. Based on this reference, a sent notification identifier at a position following the sent notification identifier having the same value as the received notification identifier attached to the re-send request is searched for.

However, it is not necessarily essential to refer to the sent ordinal position identifiers. For example, the reference to the sent ordinal position identifiers is not necessary in a case where the following method is used: every time a notification is sent, its sent notification identifier is stored sequentially while being linked to one of memory addresses arranged in ascending order. Then, a sent notification identifier at a position following the sent notification identifier having the same value as the received notification identifier attached to the re-send request can be searched for with reference to the memory addresses.

[Operation Example 5] Notification is Re-Sent Due to the Application Being Offline FIG. 20 is a timing chart showing Operation Example 5. Referring to FIG. 20, the notification management server 1410 sends push notifications to a destination application 1402 assigned with "001" as a destination identifier 1601 in the following order. First, a push notification attached with <a, aa> as a pair of a self notification identifier and a self ordinal position identifier is sent. Next, a push notification attached with <b, bb> as another pair is sent. Next, a push notification attached with <e, ee> as a further pair is sent. Next, a push notification attached with <f, ff> as a furthermore pair is sent. Next, a push notification attached with <j, jj> as a still furthermore pair is sent.

Note that the push notification attached with <b, bb> as the pair of the self notification identifier and the self ordinal position identifier and the push notifications after that are further attached with <a, aa>, <b, bb>, <e, ee>, and <f, ff> as respective pairs of a sent notification identifier and a sent ordinal position identifier.

Also, the application 1402 is offline in a period in which the notification management server 1410 sends the push notification attached with <e, ee> as the pair of the self notification identifier and the self ordinal position identifier and the push notification attached with <f, ff> as the pair.

Once the first push notification, i.e., the push notification attached with <a, aa> as the pair of the self notification identifier and the self ordinal position identifier, arrives at the destination application 1402, "a" is held in the received notification identifier holding unit 1403 as a received notification identifier. Also, "aa" is held in the received ordinal position identifier holding unit 1406 as a received ordinal position identifier.

Once the push notification attached with <b, bb> as the pair of the self notification identifier and the self ordinal position identifier arrives at the destination application 1402, "a" as the received notification identifier is compared with "a" as the sent notification identifier. Because they are the same, the destination application 1402 does not issue a re-send request. Also, in the received notification identifier holding unit 1403, "a" as the received notification identifier is updated to "b." Further, in the received ordinal position identifier holding unit 1406, "aa" as the received ordinal position identifier is updated to "bb."

The push notifications attached with <e, ee> and with <f, ff> as respective pairs of the self notification identifier and the self ordinal position identifier do not arrive at the destination application 1402. Thus, "b" remains held in the received notification identifier holding unit 1403 as the received notification identifier. Also, "bb" remains held in the received ordinal position identifier holding unit 1406 as the received ordinal position identifier.

Once the push notification attached with <j, jj> as the pair of the self notification identifier and the self ordinal position identifier arrives at the destination application 1402, "b" as the received notification identifier is compared with "f" as the sent notification identifier, and they are not the same. Also, "bb" as the received ordinal position identifier indicates an ordinal position temporally before that of "ff" as the sent ordinal position identifier. Then, the next push notification does not arrive within a certain period of time. Thus, the destination application 1402 issues a re-send request to the notification management server 1410. Also, in the received notification identifier holding unit 1403, "b" as the received notification identifier is updated to "j." Further, in the received ordinal position identifier holding unit 1406, "bb" as the received ordinal position identifier is updated to "jj."

The re-send request has attached with the received notification identifier "b" and the sent notification identifier "f."

Upon receipt of the re-send request, the notification management server 1410 refers to the sent notification identifier list 1602-1, which is in the column corresponding to the destination identifier "001," in the destination-specific notification list 1600. Then, the notification management server 1410 obtains "e" and "f," which are in the range from the notification identifier "e" following the received notification identifier "b" attached to the re-send request to the sent notification identifier "f" attached to the re-send request. In this event, reference is made to the sent ordinal position identifiers paired with the sent notification identifiers in the entries of the sent notification identifier list in order to check the ordinal positions of the sent notification identifiers. Alternatively, memory addresses where the respective sent notification identifiers are stored may be referred to instead of the ordinal position identifiers. Then, the notification management server 1410 refers to the notification content list 1700, obtains notification contents "E" and "F" corresponding to the notification identifiers "e" and "f," respectively, and re-sends two push notifications respectively including {"<e, ee>", "<b, bb>", "E"} and {"<f, ff>", "<e, ee>", "F"} to the destination application 1402.

Figure 21:
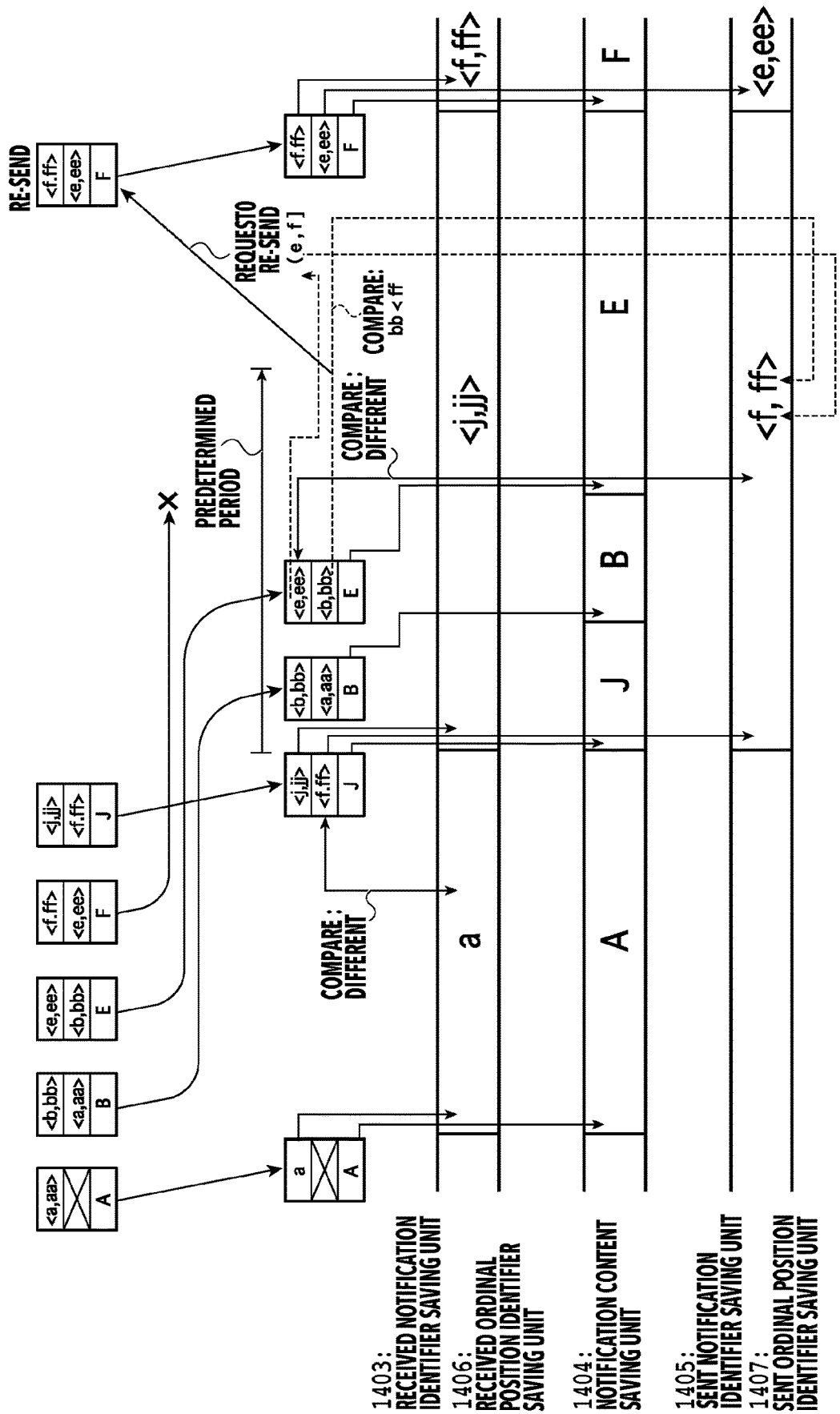
FIG. 21 is a timing diagram showing Operation Example 6 of the notification delivery system of the second embodiment.

[Operation Example 6] One Notification is Re-Sent Due to Switching of Push Notifications FIG. 21 is a timing chart showing Operation Example 6. Referring to FIG. 21, the notification management server 1410 sends push notifications to a destination application 1402 assigned with "001" as the destination identifier 1601 in the following order. First, a push notification attached with <a, aa> as a pair of a self notification identifier and a self ordinal position identifier is sent. Next, a push notification attached with <b, bb> as another pair is sent. Next, a push notification attached with <e, ee> as a further pair is sent. Next, a push notification attached with <f, ff> as a still further pair is sent. Next, a push notification attached with <j, jj> as another still further pair is sent.

Note that the push notification attached with <b, bb> as the pair of the self notification identifier and the self ordinal position identifier and the push notifications after that are further attached with <a, aa>, <b, bb>, <e, ee>, and <f, ff> as respective pairs of a sent notification identifier and a sent ordinal position identifier.

In this example, due to differences between the notifications in their delay time at the push notification server 1420 or on the Internet 1430, the destination application 1402 assigned with "001" as the destination identifier 1601 receives the push notifications with <a, aa> and <j, jj> as respective pairs of the self notification identifier and the self ordinal position identifier consecutively.

Once the first push notification, i.e., the push notification attached with <a, aa> as the pair of the self notification identifier and the self ordinal position identifier, arrives at the destination application 1402, "a" is held in the received notification identifier holding unit 1403 as a received notification identifier, and "aa" is held in the received ordinal position identifier holding unit 1406 as a received ordinal position identifier.

Next, once the push notification attached with <j, jj> as the pair of the self notification identifier and the self ordinal position identifier is received by the destination application 1402, "a" as the received notification identifier is compared with "f" as the sent notification identifier, and they are not the same. Also, the received ordinal position identifier "aa" indicates an ordinal position temporally before that of the sent ordinal position identifier "ff."

Then, "f" as the sent notification identifier is held in the sent notification identifier holding unit 1405. Also, "ff" as the sent ordinal position identifier is held in the sent ordinal position identifier holding unit 1407.

Within a certain period of time after that, the destination application 1402 receives the push notifications attached with <b, bb> and <e, ee> as respective pairs of a self notification identifier and a self ordinal position identifier in this order. The application 1402 does not receive the push notification attached with <f, ff> as the pair of a self notification identifier and a self ordinal position identifier within the certain period of time.

Then, "e" as the self notification identifier of the latest one of the two new push notifications that are received by the destination application 1402 within the certain period of time is compared with "f" as the sent notification identifier held in the sent notification identifier holding unit 1405. They are not the same.

Thus, the destination application 1402 sends a re-send request.

The re-send request is attached with "e" as a new push notification identifier and "f" as a sent notification identifier.

Upon receipt of the re-send request, the notification management server 1410 refers to the sent notification identifier list 1602-1, which is in the column corresponding to the destination identifier "001," in the destination-specific notification list 1600. Then, the notification management server 1410 obtains "f," which is in the range from the notification identifier "f" following the received notification identifier "e" to the sent notification identifier "f." In this event, reference is made to the sent ordinal position identifiers paired with the sent notification identifiers in the list in order to check the ordinal positions of the respective sent notification identifiers. Alternatively, memory addresses where the respective sent notification identifiers are stored may be referred to instead of the ordinal position identifiers. Then, the notification management server 1410 refers to the notification content list 1700, obtains the notification content "F" corresponding to the notification identifier "f," and re-sends a push notification including {"<f, ff>", "<e, ee>", "F"} to the destination application 1402.

Third Embodiment

In the first embodiment, a self notification identifier and a notification content are held in the notification content list 500 every time a new notification is created. Also, a sent notification identifier is held in the sent notification identifier list 402-i corresponding to the destination in the destination-specific notification list 400 every time notification information is sent to the destination. Then, once a re-send request is received, a notification content to be re-sent is determined based on the destination-specific notification list 400 and the notification content list 500, and the notification content is re-sent. However, depending on the notification content, it is not always necessary to re-send. If self notification identifiers are generated for notification contents that do not need to be re-sent and registered in the notification content list 500, unnecessary information will be stored in the notification content list 500. In other words, the resources of the notification management server 110 are used wastefully, and this is not preferable.

Thus, in the present embodiment, after new notification information is created, whether to register its self notification identifier and notification content in the notification content list 500 is determined based on re-send necessity information.

Note that the processing performed by the terminal apparatus 1400 upon receipt of a notification and the processing performed by the notification management server 1410 in re-sending a notification upon receipt of a notification re-send request from the terminal apparatus 1400 are the same as those in the first embodiment and iterated explanation thereof is omitted.

Figures 22, 22A:
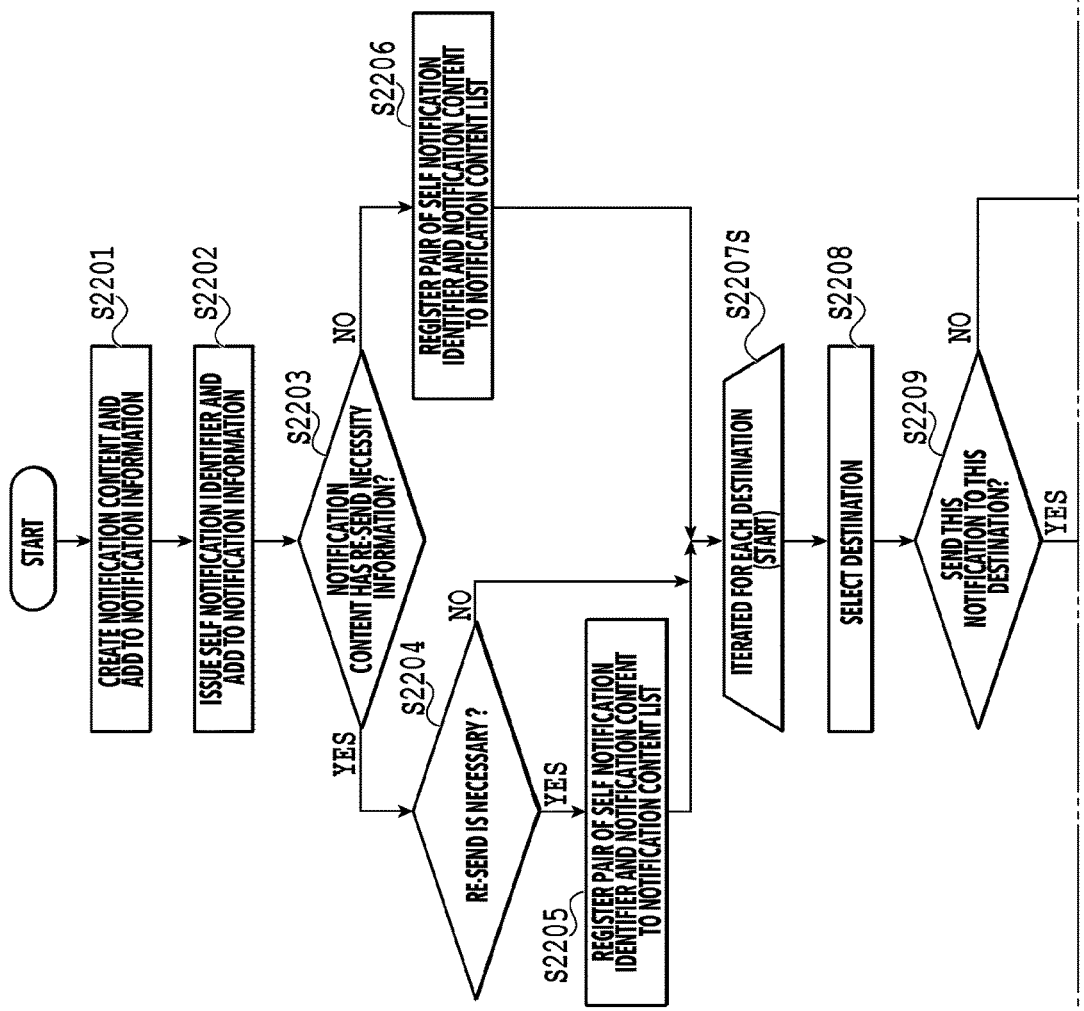
FIG. 22 is a diagram showing the relationship of FIGS. 22A and 22B.
FIGS. 22A and 22B constitute a flowchart showing sending processing performed by a notification management server in a third embodiment.
Figure 22B:
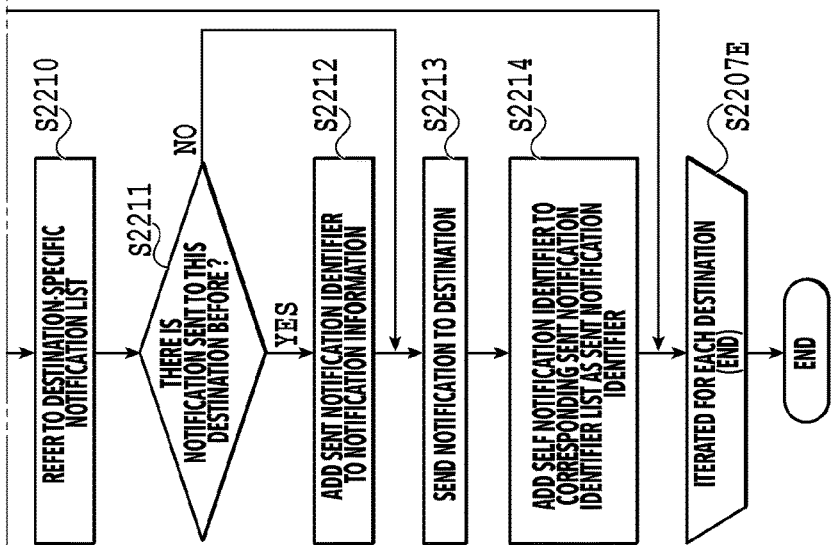

FIGS. 22A and 22B constitute a flowchart showing processing that is performed by the notification management server 110. The processing starts with creating a new notification content and ends with sending the notification to the push notification server 120. First, in S2201, the CPU 301 of the notification management server 110 creates a new notification content. Examples of the new notification content include a content to be displayed on the screen of the terminal apparatus 1400 and a content to be supplied to the application 1402.

Also, a new notification content of the present embodiment includes re-send necessity information as well. A new notification content of the first embodiment does not include re-send necessity information. The notification management server 110 of the present embodiment supports both of a notification content of the first embodiment and a notification content of the present embodiment. In other words, even in a case where notification contents of the first embodiment and notification contents of the present embodiment are mixed, the notification management server 110 of the present embodiment can handle both of them.

After creating the new notification content, in S2202, the CPU 301 of the notification management server 110 issues a new notification identifier as a self notification identifier and attaches the self notification identifier to the new notification content.

Next, in S2203, the CPU 301 of the notification management server 110 confirms whether the new notification content created includes re-send necessity information.

If the new notification content does not include re-send necessity information, the CPU 301 of the notification management server 110 determines "NO" in S2203, advances the processing to S2206, and registers a pair of the new notification content and the self notification identifier in the notification content list 500. Then, the CPU 301 of the notification management server 110 advances the processing to S2207S.

If the new notification content includes re-send necessity information, the CPU 301 of the notification management server 110 determines "YES" in S2203, and advances the processing to S2204.

If the re-send necessity information indicates that re-send is necessary, the CPU 301 of the notification management server 110 determines "YES" in S2204, advances the processing to S2205, and registers a pair of the new notification content and the self notification identifier in the notification content list 500. Then, the CPU 301 of the notification management server 110 advances the processing to S2207S.

If, on the other hand, the re-send necessity information indicates that re-send is unnecessary, the CPU 301 of the notification management server 110 determines "NO" in S2204, bypasses S2205, and advances the processing to 2207S.

The processing from S2207S to SS2207E is the same as that from S704S to S704E in the first embodiment and iterated explanation thereof is omitted.

In a case of receiving a re-send request for a notification content which does not need to be re-sent, the notification management server 110 cannot obtain the notification content in the search performed in S906 because the notification content is not held in the notification content list 500. Thus, a push notification which does not need to be re-sent is not re-sent from the notification management server 110.

Note that it is also possible to employ a new configuration by applying a change similar to the change from the first embodiment to the third embodiment to the second embodiment.

The configuration thus described makes it possible to reduce the amount of information held in the notification content list 500 because the notification management server 110 confirms, in creating a notification, whether to register its notification content in the notification content list 500 based on re-send necessity information indicating whether it is needed to re-send the notification content upon a request Thus, the load on the notification management server can be reduced. Also, because a notification that is unnecessary to be re-sent is not re-sent, it is possible to suppress the occurrence of useless communication, while making it possible for the terminal device 100 to receive all the notifications requiring re-sending.

Fourth Embodiment

Some notification contents initially need to be re-sent upon request, but then after a certain period of time, become unnecessary to be re-sent. For example, if the notification content is for a campaign with a limited period of time, there is no need to re-send such notification content once the limited period has passed.

Thus, in the present embodiment, information on an expiration date can be included in a notification content as needed. Then, for example, the CPU 301 of the notification management server 110 confirms whether or not an expiration date is included in each notification content stored in a notification content list 500 every time an instruction for updating the notification content list 500 is periodically received from a timer. Then, the CPU 301 deletes from the notification content list 500 any entry which satisfies conditions that the notification content includes an expiration date and that the expiration date has passed. By doing so, it becomes possible to set a length of the expiration date for each notification content.

Also, in the present embodiment, a retention period can be set for the notification content list 500 itself. For example, every time the notification content list is periodically updated by the timer, for all the notifications held in the notification content list 500, CPU 301 confirms whether a condition that the retention period has passed since the notification was created. Then, any entry related to the notification satisfying the condition is deleted from the notification content list 500. By doing this, regardless of whether or not the information about the expiration date is included in the notification contents, it is possible to uniformly delete, from the notification contents list, the notifications for which a predetermined period has passed since the time of registration.

Note that the processing performed by the notification management server 110 in creating a notification and sending the notification to the terminal apparatus 100 is the same as that in the first embodiment and therefore, iterated explanation thereof is omitted. The processing performed by the terminal apparatus 100 upon receipt of a notification is also the same as that in the first embodiment and therefore, iterated explanation thereof is omitted. Further, the processing performed by the notification management server 110 in re-sending a notification upon receipt of a notification re-send request from the terminal apparatus 100 is also the same as that in the first embodiment and therefore, iterated explanation thereof is omitted.

Figure 23:
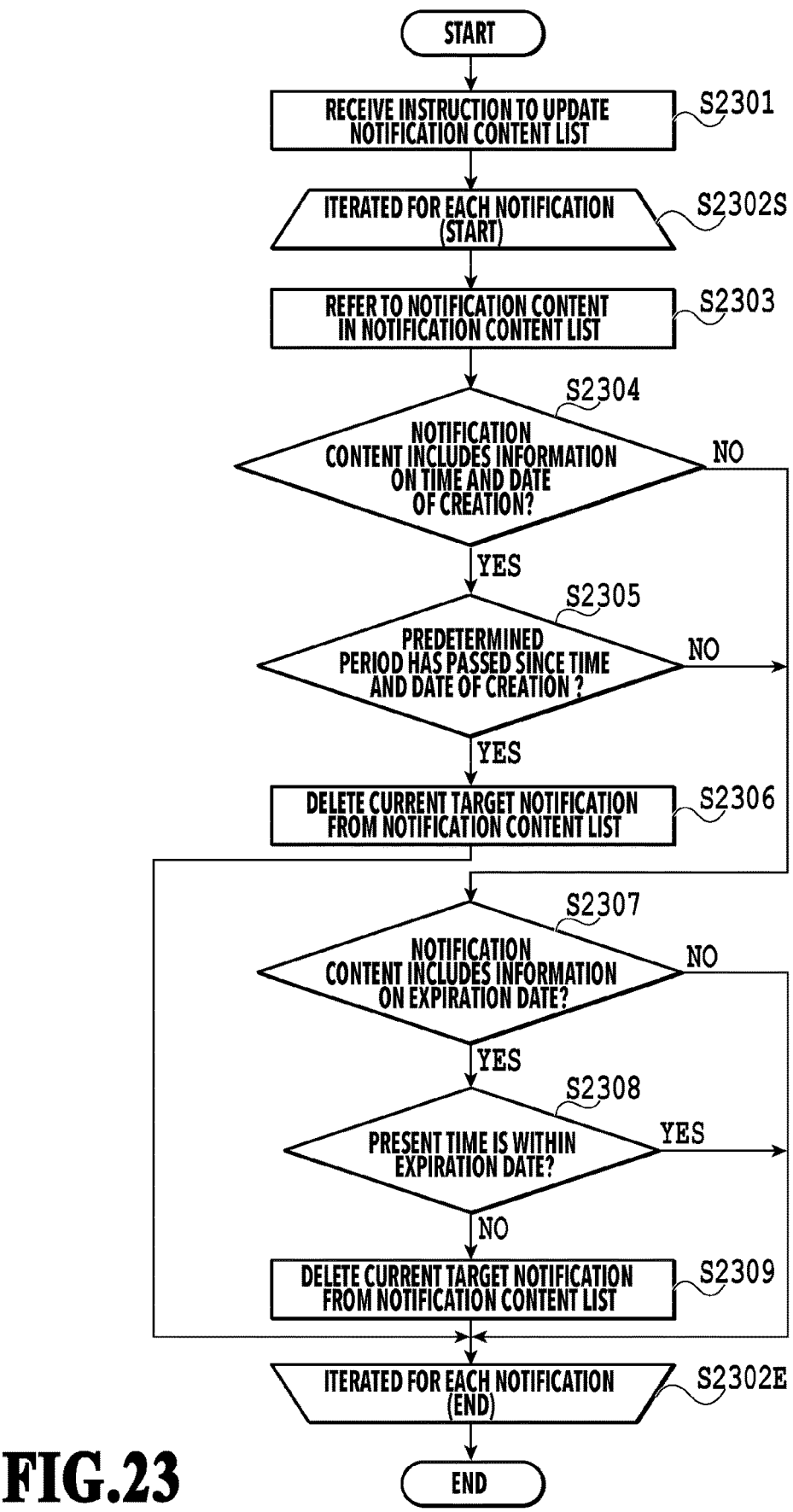
FIG. 23 is a flowchart showing sending processing performed by a notification management server in a fourth embodiment.

FIG. 23 is a flowchart of processing performed by the notification management server 110 to update the notification content list 500.

First, in S2301, the processing is started upon receipt of an update instruction for updating the notification content list 500. The update instruction is issued manually by an administrator or automatically and periodically using a timer or the like.

After S2301, the CPU 301 of the notification management server 110 repeats S2302S to S2302E for each entry including a notification content and a self notification identifier held in the notification content list 500.

In each iteration, first in S2303, the CPU 301 of the notification management server 110 refers to the notification content targeted in the current iteration (hereinafter referred to as a "target notification content"). Next, in S2304, the CPU 301 of the notification management server 110 confirms whether the target notification content includes information on the time and date of creation.

If the target notification content includes information on the time and date of creation, the CPU 301 of the notification management server 110 determines "YES" in S2304, advances the processing to S2305, and confirms whether a predetermined period has passed since the creation of the target notification content. The predetermined period is any retention period for the notification content set by the administrator. If the predetermined period has passed since the creation of the target notification content, the CPU 301 of the notification management server 110 determines "YES" in S2305 and advances the processing to S2306. In S2306, the CPU 301 of the notification management server 110 deletes an entry including the target notification content from the notification content list 500 and ends the current iteration.

If the target notification content does not include information on the time and date of creation, the CPU 301 of the notification management server 110 determines "NO" in S2304 and advances the processing to S2307. Also, if the predetermined period has not passed since the creation of the target notification content, the CPU 301 of the notification management server 110 determines "NO" in S2305 and advances the processing to S2307.

In S2307, the CPU 301 of the notification management server 110 confirms whether the target notification content includes information on an expiration date.

If the target notification content includes information on an expiration date, the CPU 301 of the notification management server 110 determines "YES" in S2307, advances the processing to S2308, and confirms whether the present time is within the expiration date.

If the present time is not within the expiration date, the CPU 301 of the notification management server 110 determines "NO" in S2308, advances the processing to S2309, deletes the entry including the target notification content from the notification content list 500, and ends the current iteration.

If the target notification content does not include information on an expiration date, the CPU 301 of the notification management server 110 determines "NO" in S2307 and ends the current iteration. Also, if the present time is within the expiration date, the CPU 301 of the notification management server 110 determines "YES" in S2308 and ends the current iteration.

Note that not both, but only one of the notification content deletion based on an expiration date and the notification content deletion based on a retention period may be performed. This can be implemented by, for example, omitting one of S2306 and S2309 and maintaining the other one.

Upon receipt of a re-send request for a notification content the expiration date for which has passed or upon a re-send request for a notification content the retention period for which has passed, the notification management server 110 cannot obtain the notification content in the search performed in S906 because the notification content is no longer held in the notification content list 500. This can ensure that the notification management server 110 does not re-send push notifications that do not need to be re-sent.

Note that it is also possible to constitute a new configuration by applying a change similar to the change from the first embodiment to the fourth embodiment to the second embodiment. Also, it is also possible to combine the third embodiment with the fourth embodiment. Further, it is also possible to apply a change similar to the change from the first embodiment to the third embodiment, and then apply a change similar to the change from the first embodiment to the fourth embodiment to the second embodiment.

In the configuration thus described, an entry including an old notification content is deleted based on the information related to an expiration date included in the notification content or the information related to a retention period set in the notification content list 500. This can reduce the load on the notification management server 110. Also, not re-sending an unnecessary notification content can reduce unnecessary communications.

Fifth Embodiment

In the present embodiment, computer programs are used. More specifically, a computer program for causing the computer 300 to function as the notification management server 110 is recorded in a computer-readable recording medium in advance. Then, by reading the computer program from the recording medium and executing the computer program, the computer 300 functions as the notification management server 110. Note that the computer 300 reads an OS from a computer-readable recording medium and executes the OS. Then, at least part of the OS may cooperate in the event where the computer 300 executes the computer program for causing the computer 300 to function as the notification management server 110.

Similarly, a computer program for causing the computer 300 to function as the terminal apparatus 100 is recorded in a computer-readable recording medium in advance. Then, by reading the computer program from the recording medium and executing the computer program, the computer 300 functions as the terminal apparatus 100. Note that the computer 300 reads an OS from a computer-readable recording medium and executes the OS. Then, at least part of the OS may cooperate in the event where with the computer 300 executes the computer program for causing the computer 300 to function as the terminal apparatus 100.

Examples of the computer-readable recording medium usable to record the computer programs include a flexible disk and a hard disk. Other examples include an optical disk, a magneto-optical disk, a CD-ROM, a CD-R, a magnetic tape, a non-volatile memory card, a ROM, and a DVD.

A function extension board may be inserted into the computer 300 so that a CPU in the function extension board operates instead of or in cooperation with the CPU in the computer 300. Also, a computer-readable recording medium may be mounted for the function extension board so that the CPU in the computer 300 or the CPU in the function extension board reads the computer programs from the recording medium and executes the computer programs.

In the following description, a first CPU is the CPU in the computer 300 functioning as the notification management server 110 or the CPU in the function extension board inserted into this computer 300, and a second CPU is the CPU in the computer 300 functioning as the terminal apparatus 100 or the CPU in the function extension board inserted into this computer 300.

By program execution, the first CPU functions as a self notification identifier attaching unit that executes the self notification identifier attaching step (S702).

Also, by program execution, the first CPU functions as a sent notification identifier attaching unit that executes the sent notification identifier attaching step (S707).

Further, by program execution, the first CPU functions as a sending unit that executes the sending step (S708).

Further, by program execution, the first CPU functions as a re-sending unit that executes the re-sending step (S901 to S908).

Further, by program execution, the second CPU functions as a received notification identifier holding unit that executes the notification identifier storing step (S814).

Further, by program execution, the second CPU functions as a re-send requesting unit that executes the re-send requesting step (S802, S803 (YES), S804 (YES), S805, S806, S807 (YES), S808, S809 (NO), S813).

Further, by program execution, the first CPU functions as a sent notification identifier holding unit that executes the sent notification identifier list storing step (S709).

Further, by program execution, the first CPU functions as a obtaining unit that executes the obtaining step (S903 to S907).

Further, by program execution, the second CPU functions as a re-send requesting unit that executes the re-send requesting step (S808, S809 (YES), S810, S811 (NO), S812).

Further, by program execution, the first CPU functions as a re-sending unit that executes the re-sending step (S901 to S908).

Further, by program execution, the first CPU functions as a sent notification identifier list holding unit that executes the sent notification identifier list storing step (S709).

Further, by program execution, the first CPU functions as a obtaining unit that executes the obtaining step (S903 to S907).

Further, by program execution, the first CPU functions as a notification content list holding unit that executes the notification content list storing step (S703).

Further, by program execution, the first CPU functions as a save cancelling unit that executes the save cancelling step (S2303 (YES), S2304 (NO)).

Further, by program execution, the first CPU functions as a deleting unit that executes the deleting step (S2304 (YES), S2305 (YES), S2306, S2307 (YES), S2308 (NO), S2309).

Other Embodiments

What is held in the notification content region in the notification content list 500 may be a notification content itself or reference information (e.g., an address in a storage apparatus) indicating the area where the notification content itself is stored.

A notification content may be reference information such as a URL.

The notification management server 110, the push notification server 120, and the application 102 may conform to the Windows (registered trademark) Push Notification Service (WNS). In that case, the notification management server 110, the push notification server 120, and the application 102 correspond to an application server, a WNS server, and an application client, respectively. Then, the OS in the terminal apparatus 100 may include the Windows Notification Platform.

Meanwhile, the notification management server 110 may include the function of the push notification server 120.

Although the notification management servers 110, 1410 in the above embodiments function as a notification sending apparatus, a different apparatus may be used as the notification sending apparatus. Although the terminal apparatuses 100, 1400 that respectively execute the applications 102, 1402 in the above embodiments function as a notification receiving apparatus, a different apparatus may be used as the notification receiving apparatus.

In the above embodiments, the notification content 203, 1503 is displayed on the screen for the user by using the OS notification control unit 101, 1401. However, the notification content 203, 1503 may be displayed on the screen for the user by using a different program (including the application 102, 1402).

In the method the flowchart of which is shown in FIGS. 8B and 8B, S808, S809, S810, S811, and S812 may be omitted unless consideration is taken as to the switching of the order of notifications. In other words, if S807 is "YES," the processing may be always advanced to S813. Similarly, in the method the flowchart of which is shown in FIGS. 19A and 19B, S1911, S1912, S1913, S1914, and S1915 may be omitted unless consideration is taken as to the switching of the order of notifications. In other words, if S1910 is "YES," the processing may be always advanced to S1916.

In the third and fourth embodiments, notification contents with no entry in the notification contents list 500 are not re-sent. Instead, the destination-specific notification list 400 may be used to determine the need to re-send the notification content. For example, each entry in the sent notification identifier list 402-$i$ is given not only a sent notification identifier but also a re-send need flag, and the need for re-send is determined based on the re-send need flag. In this way, even for the same notification content, the need for re-send can be controlled for each destination.

In the above embodiments, basically, all the notifications included in the range specifying information are re-sent. As an exceptional case, a notification content which is not entered in the notification content list is not re-sent. In addition to this, for example, the number of notifications to re-send may be limited. Also, the time intervals for re-sending notifications may be adjusted.

The self notification identifier in the first embodiment has a self-other identification function and a sending ordinal position identification function. It is sufficient that the self-other identification function fulfills its function within a predetermined range. It is also sufficient that the sending ordinal position identification function fulfills its function within a predetermined range.

Similarly, the self notification identifier in the second embodiment has a self-other identification function, and it is sufficient that the self-other identification function fulfills its function within a predetermined range. The ordinal position identifier in the second embodiment has a sending ordinal position identification function, and it is sufficient that the sending ordinal position identification function fulfills its function within a predetermined range.

The self notification identifier in the first embodiment has both a self-other identification function and a sending ordinal position identification function. However, the units in the first embodiment can operate properly even in a case where the first embodiment uses self notification identifiers that have a sending ordinal position identification function and do not have a self-other identification function. The units in the first embodiment can also operate properly in a case where the ordinal position identifiers in the second embodiment (the self ordinal position identifier, the sent ordinal position identifier, and the received ordinal position identifier) are used as the notification identifiers in the first embodiment (the self notification identifier, the sent notification identifier, and the received notification identifier).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory apparatus, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-102801, filed on Jun. 27, 2022, which is hereby incorporated by reference wherein in its entirety.

What is claimed is:

1. A notification sending apparatus in a notification delivery system including the notification sending apparatus for sending notifications and a notification receiving apparatus for receiving the notifications, the notification sending apparatus comprising:
at least one memory storing instructions; and
at least one processor that executes the stored instructions to function as:
a self notification identifier attaching unit configured to attach a self notification identifier to each notification, the self notification identifier having at least a sending ordinal position identification function;
a sent notification identifier attaching unit configured to attach, to each notification, the self notification identifier attached to a notification that was sent immediately before each notification, as a sent notification identifier;
a sending unit configured to send the notification receiving apparatus the notifications, each of which is attached with the self notification identifier and the sent notification identifier; and
a re-sending unit configured, upon receipt of a re-send request including range specifying information from the notification receiving apparatus, to obtain at least one notification that has been sent and needs to be re-sent based on the range specifying information, and to re-send the at least one obtained notification to the notification receiving apparatus,
wherein the notification receiving apparatus determines whether the sent notification identifier is the same as the latest self notification identifier stored in the notification receiving apparatus, and if the sent notification identifier is different from the latest self notification identifier, the notification receiving apparatus generates the range specifying information on the basis of the sent notification identifier and the latest self notification identifier.

2. The notification sending apparatus according to claim 1, wherein the at least one process further executes the stored instructions to function as:

a sent notification identifier list holding unit where a list of the sent notification identifiers is stored as a sent notification identifier list; and
an obtaining unit configured to obtain, from the sent notification identifier list, at least one sent notification identifier in a range specified by the range specifying information, as at least one self notification identifier attached to the at least one notification that has been sent and needs to be re-sent.

3. The notification sending apparatus according to claim 1,
wherein the re-sending unit specifies the at least one notification that has been sent and needs to be re-sent on the basis of the at least one sent notification identifier obtained as the at least one self notification identifier by the obtaining unit.

4. The notification sending apparatus according to claim 1, wherein
the notifications sent by the sending unit respectively contain notification contents,
the notification sending apparatus further comprises a notification content list holding unit where a list of the notification contents included in respective notifications is stored as a notification content list, and
the re-sending unit obtains, from the notification content list, at least one notification content to be included in the at least one notification that has been sent and needs to be re-sent.

5. The notification sending apparatus according to claim 4, wherein the at least one processor further executes the stored instructions to function as a storage cancellation unit configured, for at least a notification which does not need to be re-sent, to cancel storing of the notification content into the notification content list, wherein
the re-sending unit cancels re-sending of a notification the notification content of which is unobtainable from the notification content list.

6. The notification sending apparatus according to claim 4, wherein the at least one processor further executes the stored instructions to function as a deleting unit configured to delete the notification content that satisfies a predetermined condition from the notification content list, wherein
the re-sending unit cancels re-sending of a notification the notification content of which is unobtainable from the notification content list.

7. The notification sending apparatus according to claim 1, wherein
the self notification identifier further has a self-other identification function.

8. A notification receiving apparatus in a notification delivery system including a notification sending apparatus for sending notifications and the notification receiving apparatus for receiving the notifications, the notification receiving apparatus comprising:
at least one memory storing instructions; and
at least one processor that executes the stored instructions to function as:
a receiving unit configured to receive notifications, each of which is attached with a self notification identifier having at least a sending ordinal position identification function and is further attached with a sent notification identifier which is the same as the self notification identifier attached to a notification which is sent from the notification sending apparatus immediately before each notification;
a received notification identifier holding unit where, every time the notification receiving apparatus receives a notification, the self notification identifier attached to the received notification is stored as a received notification identifier; and
a first re-send requesting unit configured to send a first re-send request including first range specifying information to the notification sending apparatus upon receipt of a notification in a case where the received notification identifier held in the received notification identifier holding unit indicates a sending ordinal position temporally before a sending ordinal position indicated by the sent notification identifier attached to the notification received this time,
wherein the notification receiving apparatus determines whether the sent notification identifier is the same as the latest self notification identifier stored in the notification receiving apparatus, and if the sent notification identifier is different from the latest self notification identifier, the notification receiving apparatus generates the range specifying information on the basis of the sent notification identifier and the latest self notification identifier.

9. The notification receiving apparatus according to claim 8, wherein
even in a case where the received notification identifier held in the received notification identifier holding unit indicates a sending ordinal position temporally before a sending ordinal position indicated by the sent notification identifier included in the notification received this time, the first re-send requesting unit suspends sending the first re-send request including the first range specifying information to the notification sending apparatus for a predetermined period of time.

10. The notification receiving apparatus according to claim 9, wherein the at least one processor further executes the stored instructions to function as:
a sent notification identifier holding unit where, every time the notification receiving apparatus receives a notification, the sent notification identifier attached to the received notification is stored as a sent notification identifier; and
a second re-send requesting unit configured to send a second re-send request including a second range specifying information to the notification sending apparatus in a case where a new notification is received within the predetermined period of time and the self notification identifier attached to the new notification indicates a sending ordinal position temporally before a sending order position indicated by the sent notification identifier stored in the sent notification identifier holding unit.

11. The notification receiving apparatus according to claim 8, wherein
the self notification identifier further has a self-other identification function.

12. A notification delivery system including a notification sending apparatus for sending notifications and a notification receiving apparatus for receiving the notifications, wherein
the notification sending apparatus comprises:
at least one memory storing instructions; and
at least one processor that executes the stored instructions to function as:
a self notification identifier attaching unit configured to attach a self notification identifier to each notification, the self notification identifier having at least a sending ordinal position identification function,
a sent notification identifier attaching unit configured to attach, to each notification, the self notification identifier attached to a notification that was sent immediately before each notification, as a sent notification identifier, a sending unit configured to send the notification receiving apparatus the notifications, each of which is attached with the self notification identifier and the sent notification identifier, and a re-sending unit configured, upon receipt of a re-send request including range specifying information from the notification receiving apparatus, to obtain at least one notification that has been sent and needs to be re-sent based on the range specifying information, and to re-send the at least one obtained notification to the notification receiving apparatus, wherein the notification receiving apparatus determines whether the sent notification identifier is the same as the latest self notification identifier stored in the notification receiving apparatus, and if the sent notification identifier is different from the latest self notification identifier, the notification receiving apparatus generates the range specifying information on the basis of the sent notification identifier and the latest self notification identifier, and the notification receiving apparatus comprises:

at least one memory storing instructions; and at least one processor that executes the stored instructions to function as:

a receiving unit configured to receive notifications, each of which is attached with the self notification identifier and the sent notification identifier, a received notification identifier holding unit, every time the notification receiving apparatus receives a notification, the self notification identifier attached to the received notification is stored as a received notification identifier, and a re-send requesting unit configured to send the re-send request including the range specifying information to the notification sending apparatus upon receipt of a notification in a case where the received notification identifier held in the received notification identifier holding unit indicates a sending ordinal position temporally before a sending ordinal position indicated by the sent notification identifier attached to the notification received this time.

13. A notification sending method executed by a notification sending apparatus in a notification delivery system including the notification sending apparatus for sending notifications and a notification receiving apparatus for receiving the notifications, the notification sending method comprising the step of:

attaching a self notification identifier to each notification, the self notification identifier having at least a sending ordinal position identification function;

attaching, to each notification, the self notification identifier attached to a notification that was sent immediately before each notification, as a sent notification identifier;

sending the notification receiving apparatus the notifications, each of which is attached with the self notification identifier and the sent notification identifier; and obtaining, upon receipt of a re-send request including range specifying information from the notification receiving apparatus, at least one notification that has been sent and needs to be re-sent based on the range specifying information, and re-sending the at least one obtained notification to the notification receiving apparatus, wherein the notification receiving apparatus determines whether the sent notification identifier is the same as the latest self notification identifier stored in the notification receiving apparatus, and if the sent notification identifier is different from the latest self notification identifier, the notification receiving apparatus generates the range specifying information on the basis of the sent notification identifier and the latest self notification identifier.

\* \* \* \* \*